United States Patent
Schwartz, Jr. et al.

(10) Patent No.: US 9,361,136 B2
(45) Date of Patent: Jun. 7, 2016

(54) DECOUPLING BACKGROUND WORK AND FOREGROUND WORK

(71) Applicant: Microsoft Technology Licensing, LLC, Redmond, WA (US)

(72) Inventors: James A. Schwartz, Jr., Seattle, WA (US); Arun U. Kishan, Kirkland, WA (US); Richard K. Neves, Kirkland, WA (US); David B. Probert, Woodinville, WA (US); Hari Pulapaka, Redmond, WA (US); Alain F. Gefflaut, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/693,144

(22) Filed: Apr. 22, 2015

(65) Prior Publication Data

US 2015/0301835 A1    Oct. 22, 2015

Related U.S. Application Data

(63) Continuation of application No. 13/224,168, filed on Sep. 1, 2011, now Pat. No. 9,032,413.

(51) Int. Cl.
| | |
|---|---|
| G06F 9/445 | (2006.01) |
| G06F 9/48 | (2006.01) |
| G06F 9/54 | (2006.01) |

(52) U.S. Cl.
CPC ............ *G06F 9/445* (2013.01); *G06F 9/44521* (2013.01); *G06F 9/4881* (2013.01); *G06F 9/542* (2013.01); *G06F 2209/543* (2013.01)

(58) Field of Classification Search
CPC ... G06F 9/445; G06F 9/44521; G06F 9/4881; G06F 9/542; G06F 9/543
See application file for complete search history.

(56) References Cited

U.S. PATENT DOCUMENTS

| | | | |
|---|---|---|---|
| 5,175,855 A | 12/1992 | Putnam et al. | |
| 6,260,150 B1 | 7/2001 | Diepstraten et al. | |

(Continued)

FOREIGN PATENT DOCUMENTS

| | | |
|---|---|---|
| CN | 1233015 A | 10/1999 |
| CN | 1510579 A | 7/2004 |

OTHER PUBLICATIONS

Non-Final Office Action cited in U.S. Appl. No. 13/355,115 dated Jan. 9, 2015, 14 pgs.

(Continued)

*Primary Examiner* — Charles E Anya
(74) *Attorney, Agent, or Firm* — John Jardine; Raghu Chinagudabha; Micky Minhas

(57) ABSTRACT

Systems, methods, and apparatus for separately loading and managing foreground work and background work of an application. In some embodiments, a method is provided for use by an operating system executing on at least one computer. The operating system may identify at least one foreground component and at least one background component of an application, and may load the at least one foreground component for execution separately from the at least one background component. For example, the operating system may execute the at least one foreground component without executing the at least one background component. In some further embodiments, the operating system may use a specification associated with the application to identify at least one piece of computer executable code implementing the at least one background component.

20 Claims, 9 Drawing Sheets

(56) References Cited

U.S. PATENT DOCUMENTS

| | | | |
|---|---|---|---|
| 6,834,386 | B1 | 12/2004 | Douceur et al. |
| 7,051,098 | B2 | 5/2006 | Masters et al. |
| 7,313,688 | B2 | 12/2007 | Bishop, Jr. et al. |
| 7,334,228 | B2 | 2/2008 | Clohessy et al. |
| 7,380,218 | B2 | 5/2008 | Rundell |
| 7,421,509 | B2 | 9/2008 | Lolayekar et al. |
| 7,440,751 | B2 | 10/2008 | Boros |
| 7,640,547 | B2 | 12/2009 | Neiman et al. |
| 7,647,591 | B1 | 1/2010 | Loucks |
| 7,716,672 | B2 | 5/2010 | Douceur et al. |
| 7,720,098 | B1 | 5/2010 | Allen et al. |
| 7,765,553 | B2 | 7/2010 | Douceur et al. |
| 7,774,781 | B2 | 8/2010 | Dees et al. |
| 7,787,489 | B2 | 8/2010 | Caulfield et al. |
| 7,885,222 | B2 | 2/2011 | Cole |
| 7,904,673 | B2 | 3/2011 | Riska et al. |
| 7,945,914 | B2 | 5/2011 | Hasiuk et al. |
| 7,962,911 | B2 | 6/2011 | Cheng et al. |
| 7,970,902 | B2 | 6/2011 | Rolia et al. |
| 8,028,060 | B1 | 9/2011 | Wyld et al. |
| 8,145,785 | B1 | 3/2012 | Finkelstein et al. |
| 8,183,994 | B2 | 5/2012 | Staab |
| 8,223,655 | B2 | 7/2012 | Heinz et al. |
| 8,296,410 | B1 | 10/2012 | Myhill et al. |
| 8,316,098 | B2 | 11/2012 | Luna et al. |
| 8,352,611 | B2 | 1/2013 | Maddhuri et al. |
| 8,468,246 | B2 | 6/2013 | Mays et al. |
| 8,533,403 | B1 | 9/2013 | Lau |
| 8,645,750 | B2 | 2/2014 | Kaneko et al. |
| 8,661,447 | B1 | 2/2014 | Olliff et al. |
| 8,806,486 | B2 | 8/2014 | Martin et al. |
| 8,869,154 | B1 | 10/2014 | Hillyard et al. |
| 8,887,166 | B2 | 11/2014 | Gerovac et al. |
| 8,914,511 | B1 | 12/2014 | Yemini et al. |
| 2002/0111962 | A1 | 8/2002 | Crucs |
| 2003/0061260 | A1 | 3/2003 | Rajkumar |
| 2003/0084087 | A1 | 5/2003 | Berry |
| 2004/0054770 | A1 | 3/2004 | Touboul |
| 2005/0026654 | A1 | 2/2005 | Perez et al. |
| 2005/0132375 | A1* | 6/2005 | Douceur et al. ............. 718/100 |
| 2006/0106928 | A1 | 5/2006 | Westendorf et al. |
| 2006/0130067 | A1 | 6/2006 | Grabarnik et al. |
| 2006/0174246 | A1 | 8/2006 | Tamura et al. |
| 2006/0277391 | A1 | 12/2006 | Bittner, Jr. |
| 2007/0004468 | A1 | 1/2007 | Boros |
| 2007/0006202 | A1 | 1/2007 | Mikkelsen et al. |
| 2007/0101279 | A1 | 5/2007 | Chaudhri et al. |
| 2007/0248036 | A1 | 10/2007 | Nevalainen |
| 2007/0255798 | A1 | 11/2007 | Schneider |
| 2008/0049714 | A1 | 2/2008 | Commarford et al. |
| 2008/0160958 | A1 | 7/2008 | Abichandani et al. |
| 2008/0189708 | A1* | 8/2008 | Cheng ..................... G06F 9/542 718/102 |
| 2008/0310639 | A1 | 12/2008 | Kanda et al. |
| 2008/0313639 | A1 | 12/2008 | Kumar et al. |
| 2009/0037430 | A1 | 2/2009 | Mukkamala et al. |
| 2009/0182608 | A1 | 7/2009 | Tran et al. |
| 2009/0317796 | A1 | 12/2009 | Lin et al. |
| 2010/0042400 | A1 | 2/2010 | Block et al. |
| 2010/0112955 | A1 | 5/2010 | Krishnaswamy et al. |
| 2010/0115193 | A1 | 5/2010 | Manus et al. |
| 2010/0115525 | A1 | 5/2010 | Loucks |
| 2010/0185396 | A1 | 7/2010 | Docherty |
| 2010/0185758 | A1 | 7/2010 | Hoga et al. |
| 2010/0199063 | A1 | 8/2010 | Sechrest et al. |
| 2010/0302002 | A1 | 12/2010 | Guo et al. |
| 2010/0312776 | A1 | 12/2010 | Burrichter et al. |
| 2011/0239156 | A1 | 9/2011 | Lin |
| 2011/0249668 | A1* | 10/2011 | Van Milligan ......... G06F 9/485 370/352 |
| 2011/0252430 | A1* | 10/2011 | Chapman et al. ............. 718/107 |
| 2011/0292454 | A1* | 12/2011 | Karmakar et al. ............. 358/296 |
| 2011/0296418 | A1 | 12/2011 | Kim et al. |
| 2012/0054752 | A1 | 3/2012 | Chin |
| 2012/0079016 | A1 | 3/2012 | Hung et al. |
| 2012/0081207 | A1* | 4/2012 | Toprani ................... G06F 9/445 340/4.3 |
| 2012/0096287 | A1 | 4/2012 | Kamath et al. |
| 2012/0185532 | A1* | 7/2012 | Kristiansson et al. ........ 709/203 |
| 2012/0260118 | A1* | 10/2012 | Jiang et al. .................... 713/340 |
| 2012/0324467 | A1 | 12/2012 | Lemoratto et al. |
| 2013/0024812 | A1 | 1/2013 | Reeves et al. |
| 2013/0047198 | A1 | 2/2013 | Srour et al. |
| 2013/0067438 | A1 | 3/2013 | Bates |
| 2013/0067494 | A1 | 3/2013 | Srour et al. |
| 2013/0086365 | A1 | 4/2013 | Gschwind et al. |
| 2013/0110773 | A1 | 5/2013 | Burger et al. |
| 2014/0047333 | A1 | 2/2014 | Braun et al. |

OTHER PUBLICATIONS

Reply Non-Final Office Action cited in U.S. Appl. No. 13/355,115 dated Apr. 9, 2015, 12 pgs.
Notice of Allowance cited in U.S. Appl. No. 13/355,115 dated Jun. 11, 2015, 15 pgs.
Restriction/Election Office Action cited in U.S. Appl. No. 13/224,154 dated Apr. 2, 2013, 8 pgs.
Reply Restriction/Election Office Action cited in U.S. Appl. No. 13/224,154 dated Apr. 23, 2013, 10 pgs.
Non-Final Office Action cited in U.S. Appl. No. 13/224,154 dated Jul. 3, 2013, 14 pgs.
Reply Non-Final Office Action cited in U.S. Appl. No. 13/224,154 dated Jan. 3, 2014, 13 pgs.
Final Office Action cited in U.S. Appl. No. 13/224,154 dated Apr. 16, 2014, 14 pgs.
Reply Final Office Action cited in U.S. Appl. No. 13/224,154 dated Oct. 9, 2014, 9 pgs.
Notice of Allowance cited in U.S. Appl. No. 13/224,154 dated Oct. 24, 2014, 18 pgs.
Notice of Allowance cited in U.S. Appl. No. 13/224,154 dated Feb. 13, 2015, 21 pgs.
Non-Final Office Action cited in U.S. Appl. No. 13/224,168 dated Apr. 25, 2013, 45 pgs.
Reply Non-Final Office Action cited in U.S. Appl. No. 13/224,168 dated Sep. 24, 2013, 22 pgs.
Final Office Action cited in U.S. Appl. No. 13/224,168 dated Dec. 27, 2013, 35 pgs.
Reply Final Office Action cited in U.S. Appl. No. 13/224,168 dated Jun. 27, 2014, 20 pgs.
Notice of Allowance cited in U.S. Appl. No. 13/224,168 dated Jan. 9, 2015, 25 pgs.
Corrected Notice of Allowance cited in U.S. Appl. No. 13/224,168 dated Mar. 6, 2015, 8 pgs.
Non-Final Office Action cited in U.S. Appl. No. 13/664,954 dated Nov. 20, 2014, 14 pgs.
Reply Non-Final Office Action cited in U.S. Appl. No. 13/664,954 dated Feb. 20, 2015, 11 pgs.
Final Office Action cited in U.S. Appl. No. 13/664,954 dated Mar. 25, 2015, 19 pgs.
Int. Search Report cited in PCT Application No. PCT/US2011/055618 dated Sep. 28, 2012, 9 pgs.
Int. Search Report cited in PCT Application No. PCT/US2011/055630 dated Sep. 27, 2012, 9 pgs.
First Chinese Office Action cited in Chinese Application No. 20120317453.8 dated Apr. 24, 2014, 3 pgs.
Reply First Chinese Office Action cited in Chinese Application No. 20120317453.8 dated Sep. 17, 2014, 3 pgs.
Second Chinese Office Action cited in Chinese Application No. 20120317453.8 dated Dec. 31, 2014, 3 pgs.
Reply Second Chinese Office Action cited in Chinese Application No. 20120317453.8 dated Feb. 23, 2015, 2 pgs.
First Chinese Office Action cited in Chinese Application No. 201210320583.7 dated Oct. 27, 2014, 5 pgs.
Reply First Chinese Office Action cited in Chinese Application No. 201210320583.7 dated Mar. 11, 2015, 4 pgs.
Second Chinese Office Action cited in Chinese Application No. 201210320583.7 dated May 13, 2015, 3 pgs.
EP Search Report cited in EP Application No. 11871761.0 dated Apr. 10, 2015, 5 pgs.

(56) References Cited

OTHER PUBLICATIONS

EP Communication cited in EP Application No. 11871761.0 dated Apr. 29, 2015, 1 pg.
"Software Design that gets the most out of new AMD Multi-core Microprocessors", Greg Fry, Aug. 21, 2008, reprinted from the Internet at: http://developer.amd.com/documentation/articles/pages/getthemostoutofnewamdmulticoremicroprocessors.aspx., 4 pgs.
"Background Applications", Jun. 17, 2011, reprinted from the Internet at: http://read.pudn.com/downloads100/ebook/410482/brew_background_apps.pdf, 2 pgs.
"Compute Cycles", Sep. 19, 2011, reprinted from the Internet at: http://clog.cyclecomputing.com/condor/, 32 pgs.
"Scheduling", Oct. 24, 2011, reprinted from the Internet at: http://soolly.springnote.com/pages/2222862/html, 11 pgs.
"Multimedia Class Scheduler Service", Oct. 24, 2011, reprinted from the Internet at: http://msdn.microsoft.com/en-us/library/windows/desktop/ms684247(v=vs.83)aspx, 3 pgs.
"Resource reservation and power management in Android", Martin Olsson and Samuel Skanberg, Mar. 2011, reprinted from the Internet at: http://www.control.Ith.se/documents.2011/5875.pdf, 168 pgs.
"Introduction to Background Tasks, Guidelines for Developers", Sep. 13, 2011, reprinted from the Internet at: http://go.microsoft.com/fwlink/?LinkID=227329&ckcud-0x409, 16 pgs.
"Description of Performance Options in Windows", Feb. 28, 2007, reprinted from the Internet at: http://support.microsoft.com/kb/259025, 1 pg.
"Process Lifetime Management (PLM) and Managing State in Windows 8 Metro C# Applications", Jeremy Likness, Jun. 27, 2012, reprinted from the Internet at: http://www.wintellect.com/cs/blogs/jlikness/archive/2012/06/27/process-lifetime-management-plm-and-managing-state-in-windows-8-metro-c-applications.aspx. 8 pgs.
"Improving Power Efficiency for Applications" Steven Sinofsky, Feb. 7, 2012, reprinted from the Internet at: http://blogs.msdn.com/b/b8/archive/2012/02/07/improving-power-efficiency-for-applications.aspx. 49 pgs.

* cited by examiner

Broker

Broker

Broker Infrastructure

DECOUPLING BACKGROUND WORK AND FOREGROUND WORK

RELATED APPLICATION

This application is a continuation of and claims priority to U.S. application Ser. No. 13/224,168, filed on Sep. 1, 2011, entitled "DECOUPLING BACKGROUND WORK AND FOREGROUND WORK", which issued as U.S. Pat. No. 9,032,413 on May 12, 2015, at least some of which may be incorporated herein.

BACKGROUND

Conventional operating systems implement a few different execution models to manage foreground and background work of applications. Examples of processing tasks that may be considered to be foreground work include, but are not limited to, presenting a graphical user interface, responding to a user input, and any other type of work related to user interaction. Examples of processing tasks that may be considered to be background work include, but are not limited to, downloading and installing software updates, synchronizing with a server, and any other type of work that may not involve user attention.

In a first model, any number of applications are allowed to execute concurrently, both in the foreground and in the background, and compete for resources such as processor cycles and memory. This model is commonly implemented on desktop and laptop computers.

In a second model, all applications are blocked from execution except an "active" application, namely, an application with which a user is actively interacting. This model is commonly implemented on mobile devices, where, at any given time, a user typically interacts with a single application that is displayed on full screen.

In a third model, foreground work and background work for the same application are treated as being mutually exclusive, so that an application executing in the foreground is not scheduled to do any background work at the same time, and vice versa.

In a fourth model, an application may be separately instantiated for foreground work and for background work, with the two instances executing concurrently and competing for resources.

SUMMARY

The foregoing is a non-limiting summary of the invention, which is defined by the attached claims.

The inventors have recognized and appreciated several disadvantages that arise from existing operating system execution models, and have developed new execution models that provide advantages such as improved battery life and user experience.

In some embodiments, application logic for foreground work and background work may be decoupled in such a manner as to allow an operating system to separately load the foreground work and the background work, and to treat the foreground work and the background work differently when making scheduling decisions. For instance, an application may include separate components, some designated as foreground components and others designated as background components. An operating system may apply different policies to the components based on their designations, where the policies may be designed to promote efficient use of resources while delivering a rich multitasking experience to the user.

In some further embodiments, the foreground and background components may be provided in separate pieces of executable code capable of being executed independently of each other. An operating system may load the foreground and background components either in separate processes, for example, by isolating background work in a designated environment subject to certain resource restrictions (e.g., a sandbox built to host background components). Alternatively, the operating system may load the foreground and background components in the same process but in different threads, and may still able to distinguish execution threads associated with background work from execution threads associated with foreground work and make scheduling decisions accordingly.

In one embodiment, a method is provided for use by an operating system executing on at least one computer. The method comprises acts of: identifying at least one foreground component of an application; identifying at least one background component of the application (100); and loading the at least one foreground component for execution separately from the at least one background component.

In a further embodiment, at least one computer readable medium is provided having encoded thereon, at least: at least one first piece of computer executable code implementing at least one foreground component of an application; at least one second piece of computer executable code implementing at least one background component of the application; and a specification identifying the at least one second piece of code as being associated with background work for the application.

In yet a further embodiment, a computer implemented method is provided, comprising acts of: executing, in response to a user action, at least one first piece of computer executable code implementing at least one foreground component of an application; and using a specification associated with the application to identify at least one second piece of computer executable code implementing at least one background component of the application, wherein the at least one foreground component is executed without executing the at least one background component.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not necessarily drawn to scale.

DETAILED DESCRIPTION

Figure 1:
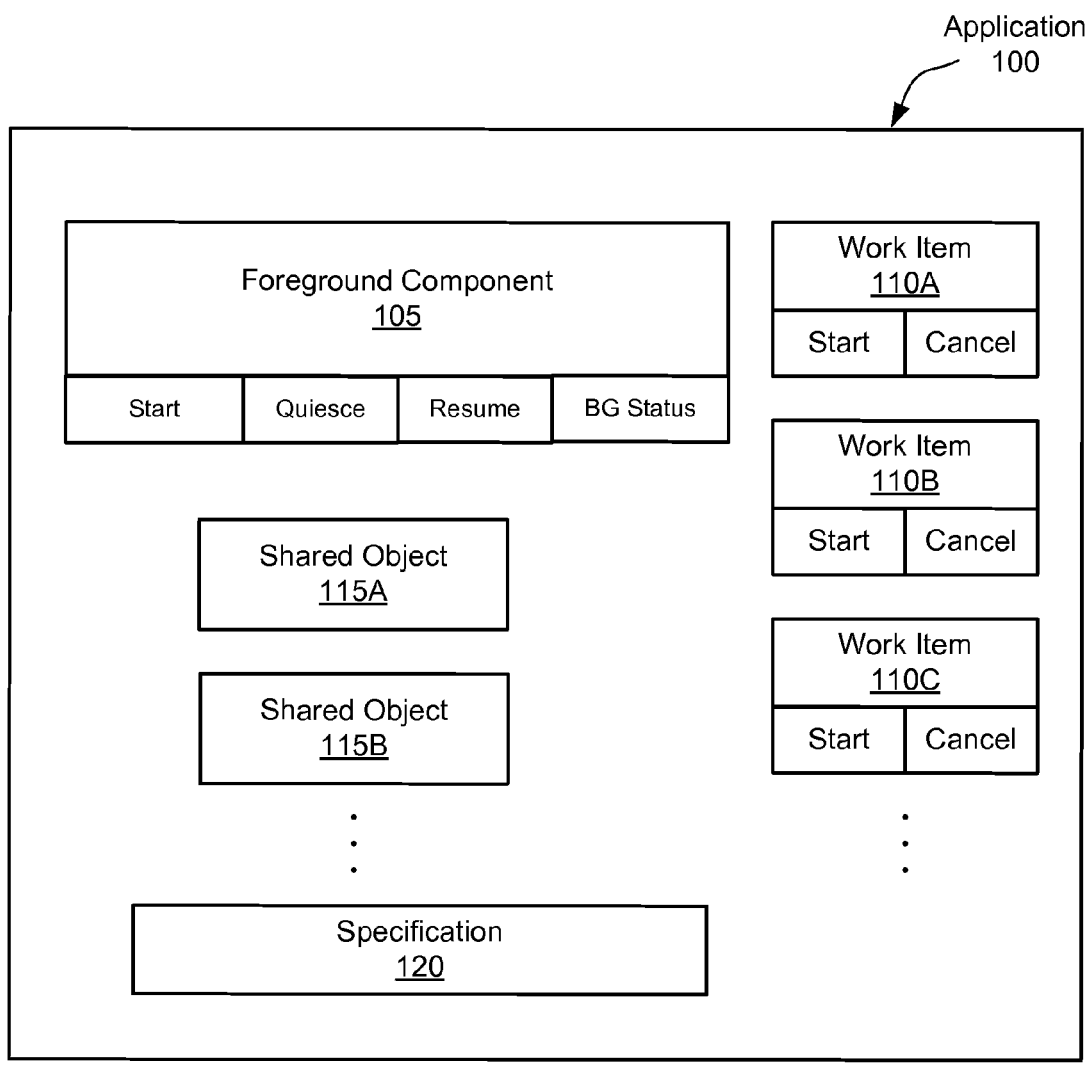
FIG. 1 shows an illustrative application 100 having decoupled logic for foreground work and background work, in accordance with some embodiments.

The inventors have recognized and appreciated several disadvantages that arise from existing operating system execution models, and have developed new execution models that provide advantages such as improved battery life and user experience.

For example, the first execution model of allowing any number of applications to execute concurrently may lead to too many processes competing for resources such as processor cycles and memory. This may in turn result in sluggish performance in a resource-constrained environment, such as on a mobile device with limited processing speed and memory. If the mobile device is running on battery power, executing processes indiscriminately may also result in shortened battery life.

On the other hand, the second execution model of blocking all but one active application may preclude desirable multitasking scenarios, such as a user composing an email while listening to music, receiving Global Positioning System (GPS) location updates, and/or receiving incoming Voice over Internet Protocol (VoIP) calls. These multitasking scenarios require that an application be able to execute to some extent even when the user is actively interacting with another application.

The third execution model, namely, executing foreground work and background work of the same application in a mutually exclusive fashion, may similarly preclude desirable multiple tasking scenarios such as a user reading one web page via a web browser while waiting for a web download to complete.

While the fourth execution model of separate instantiation may allow an operating system to concurrently execute background work and foreground work for the same application, a number of potential drawbacks still exist. For instance, there may be too much reliance on application developers to write code that behaves in a manner consistent with the foreground-background distinction. Even if an application does expose a calling parameter to allow an operating system to indicate whether the application is instantiated for foreground work or background work, a developer may inadvertently omit program logic that prevents background work from being executed when the application is instantiated for foreground work, or vice versa. This may undermine the operating system's ability to effectively control resource consumption by background work, because the operating system may have difficulty determining whether an alleged foreground instance is performing only foreground work (e.g., responding to an input received via a user interface) and not performing any unnecessary or inefficient background work (e.g., periodically synchronizing with a server).

The separate instantiation approach may also impose a burden on application developers to handle complexities relating to concurrent execution. For example, when a foreground instance and a background instance of the same application execute concurrently, the two instances may execute in different contexts and may not share state. As a result, the two instances may be able to communicate only through mechanisms explicitly provided by the operating system, which may complicate program code. The inventors have recognized and appreciated that, while such decoupling between background work and foreground work may be desirable, it may also be desirable to give developers an option not to support concurrent execution of multiple instances in different contexts.

Accordingly, in some embodiments, more flexible execution models are provided to allow an operating system to manage background work differently from foreground work.

In one aspect, application logic for foreground work and background work may be decoupled in such a manner as to allow an operating system to separately load the foreground work and the background work, and to treat the foreground work and the background work differently when making scheduling decisions.

For instance, in some embodiments, an application may include separate components, some designated as foreground components and others designated as background components. An operating system may apply different policies to the components based on their designations, where the policies may be designed to promote efficient use of resources while delivering a rich multitasking experience to the user.

For example, one or more resource management policies may be enforced against background components. These policies may be designed to limit when a background component is executed based on resources to be used by that background component. Enforcing such policies may help to conserve energy and/or reserve sufficient resources for an active application (i.e., an application with which a user is actively interacting). Such policies may, although need not, be enforced by executing background components in a controlled execution environment, such as a sandbox as known in the art, thereby isolating background components from foreground components.

In another aspect, an application developer may have an option not to support concurrent execution of foreground and background components of the same application in different processes. Selecting such an option may result in simpler and more efficient program code.

In some embodiments, the foreground and background components may be provided in separate pieces of executable code capable of being executed independently of each other. In some further embodiments, the foreground and background components may have distinct entry points, so that an operating system may load the foreground and background components in the same process but in different threads, thereby enabling the foreground and background components to execute together with shared state. In this manner, the operating system is still able to distinguish execution threads associated with background work from execution threads associated with foreground work, without requiring the application to handle various complexities of concurrent execution in different processes.

If an application does support concurrent execution, an operating system may be able to choose to load the foreground and background components either in the same process or in separate processes. A number of factors may be taken into account in choosing between these options. For instance, as discussed above, separating background work from foreground work may allow an operating system to run background work in a designated environment subject to certain resource restrictions (e.g., a sandbox built to host background components). Furthermore, separating background work from foreground work may reduce memory footprint, because executable code (e.g., libraries) relating only to user interface (UI) functionalities need not be loaded when the application is only performing background work. On the other hand, if an application frequently performs background work, or if one or more users frequently interact with the application, it may be advantageous to co-locate foreground work and background work in the same process so as to share process startup costs between foreground and background components. However, the operating system may also be able to reduce process startup costs by executing background work in a separate environment (e.g., a software container) and caching that environment.

In yet another aspect, an operating system may determine when background work is performed based on information provided by an application that specifies certain circumstances under which execution of the background work is intended. For instance, in some embodiments, the operating system may schedule background work for execution only in response to one or more specified events (also referred to as "triggers"). Examples of triggers include, but are not limited to, events relating to network activities (e.g., a packet arriving from a network), events relating to user activities (e.g., a user logging on or off), scheduled events (e.g., a timer expiring), events relating to peripheral devices (e.g., a printer notification), and the like.

In some further embodiments, an operating system may override an application's specification as to when background work is to be executed. For example, the operating system may act as a "broker" that filters events intended to trigger background work. In such a "brokered execution" model, an application may register with the operating system one or more triggers for causing a background component to execute, for example, to perform a certain unit of background work (also referred to as a "background task" or "work item"). Rather than letting such a trigger directly cause execution of the background component, the operating system may introduce an additional layer of decision making. For instance, when an application-specified trigger fires, the operating system may decide whether to signal a so-called "brokered event," which may in turn cause the background component to execute. In this manner, the operating system may ultimately decide when the background component is executed. For example, an email client may register a background synchronization task for periodic execution (e.g., every 15 minutes), and the operating system may set an appropriate timer and, when the timer expires, decide whether to execute the task based on operating conditions that exist at that time. Alternatively, or additionally, the operating system may implement a policy that limits how many triggers of a certain type an application may register with the operating system. In one example, the operating system may limit a number of times an application may register an alarm event as a trigger, where the limit may be any suitably defined value. Such a policy may be beneficial because an alarm event may "wake up" a computer from a "sleep" mode, so that limiting occurrences of alarm events may improve battery life.

As discussed above, an operating system may enforce one or more resource management policies designed to control resource consumption by background work. In some embodiments, a resource management policy may be enforced using a brokered execution model by intelligently controlling the signaling of brokered events, thereby preventing the associated background work from consuming too much power and/or impacting responsiveness of active applications. In one example, when it is determined that remaining battery power is below a selected threshold, the operating system may postpone signaling of one or more brokered events and thereby postpone certain non-critical background work. In another example, when high network latency is detected, the operating system may decrease a frequency at which one or more brokered events are signaled and thereby decrease a frequency at which an application synchronizes with a server. In yet another example, the operating system may postpone signaling of one or more brokered events because an associated application has exhausted an applicable background processing quota, which may, although need not, be specified in terms of a certain amount of background processing allowed during a certain time period. In yet another example, the operating system may postpone signaling of one or more brokered events because certain servicing activities may be underway so that relevant executable files may be temporarily unavailable. In yet another example, multiple background work items may request a common facility (e.g., network connection, graphics processing unit, webcam, etc.) that may consume a significant amount of energy when being turned on and off. Accordingly, the operating system may control signaling of one or more brokered events to consolidate execution of these work items and reduce the number of times the common facility is turned on and off, thereby conserving energy.

The inventors have further recognized and appreciated that some types of background work may be unnecessary and/or inefficient. For example, an email client waking up as scheduled to synchronize with an email server may discover that there is no network connection, and may simply go back to a suspended state to be awaken again in the future. In this situation, power may be expended just to wake up the email client briefly to check for network availability, yet no useful work may be performed. Therefore, it may be desirable to postpone waking the email client until certain system conditions are such that useful work can likely be performed. Examples of such system conditions include, but are not limited to, availability of a resource such as a connection to the Internet, and a hardware component (e.g., display, speaker, etc.) being turned on.

Accordingly, in some embodiments, an operating system may associate a background component with one or more conditions, in addition to one or more triggers. When a trigger fires, the operating system may check the associated conditions, and may schedule the background component for execution only if all associated conditions are satisfied. Thus, by specifying one or more conditions for a background component, an application developer may identify to the operating system a set of circumstances under which the background component is likely to execute productively and the operating system may schedule the background component for execution accordingly.

In some further embodiments, an operating system may be configured to latch a trigger if the operating system determines that one or more associated conditions are not satisfied at the time the trigger fires. In this manner, the operating system may continue to check the associated conditions, and may execute the background component if and when all of the associated conditions become satisfied. Alternatively, or additionally, the operating system may simply discard a fired trigger if one or more associated conditions are not satisfied at the time the trigger fires.

In yet some further embodiments, the operating system may be configured to maintain state information that can be used to evaluate one or more conditions associated with a background component. The operating system may be further configured to detect changes in the maintained state information and, in response to detecting a change, evaluate an associated condition. This may allow the operating system to detect when a background component is to be executed after a trigger for the background component has been latched (e.g., because not all conditions for the background component were satisfied at the time the trigger fired). Alternatively, or additionally, the operating system may obtain relevant information as needed for evaluating a condition, without storing such information as state information.

Following below are more detailed descriptions of various concepts related to, and embodiments of, inventive systems, methods and apparatus for managing background work and foreground work. It should be appreciated that various concepts introduced above and discussed in greater detail below may be implemented in any of numerous ways, as the disclosed concepts are not limited to any particular manner of implementation. For instance, the present disclosure is not limited to the particular arrangements of components shown in the various figures, as other arrangements may also be suitable. Such examples of specific implementations and applications are provided solely for illustrative purposes. Additionally, although various concepts disclosed herein may be useful for resource conservation in a resource-constrained computing environment, the concepts are not limited to being employed in such environments. For example, any combination of disclosed techniques may be employed not only in mobile devices, but also in desktop computers, server computers, and the like.

FIG. 1 shows an illustrative application architecture with decoupled logic for foreground work and background work, in accordance with some embodiments. In such an architecture, foreground work and background work may be provided as separate application components with interfaces adapted to allow an operating system to manage the foreground work and the background work separately. An example of an operating system adapted to separately manage foreground work and background work is described below in connection with FIG. 4.

In the example shown in FIG. 1, the application 100 includes a plurality of separate components, such as one or more foreground components (e.g., foreground component 105), one or more background components (e.g., work items 110A, 110B, 110C, . . . ), and one or more other components (e.g., shared objects 115A, 115B, . . . ). These components may be implemented in such a way that they are logically decoupled from each other. For example, in some embodiments, the components may be provided in separate pieces of executable code that are capable of being executed independently of each other. These separate pieces of executable code may have distinct entry points for use by an operating system to separately load the corresponding components.

For example, in some embodiments, an operating system may launch the application 100 in the foreground in response to a user action. Launching the application 100 in the foreground may include starting the foreground component 105 via a corresponding entry point. On the other hand, the operating system may launch the application 100 in the background in response to detecting an occurrence of one or more events (e.g., one or more triggers as described above). Launching the application 100 in the background may include starting a background component, such as work item 110A, via a corresponding entry point that is different from the entry point for the foreground component 105. For example, in one embodiment, the work item 110A may be implemented as a dynamic link library (DLL), and the operating system may execute the work item 110A in the background by loading the DLL and executing an entry point function of the DLL.

Examples of user actions that can cause an application to be launched in the foreground include, but are not limited to, a user clicking on a tile or icon corresponding to the application, the user logging in, the user attempting to access a file or object for which the application is identified as a default application, and the like. Examples of events that can be used as triggers to cause an application to be launched in the background include, but are not limited to, a timer expiring, a change in network connectivity, receiving notification from a server that new content (e.g., email messages, media content, etc.) is available for download, and the like. However, it should be appreciated that these actions and events are merely illustrative, as other actions and events may also cause an application to be launched. For example, an operating system developer, an application developer, and/or a user may specify any suitable action for causing an application to be launched in the foreground, and any suitable event for causing an application to be launched in the background. Examples of such events include, but are not limited to, synthetic events created by an operating system to organize work for efficient and/or economic usage of resources, such as an event indicating a start of a period of operation designated for maintenance, an event indicating high availability of one or more external servers, and an event indicating availability of a low-cost network (e.g., a free wireless network).

In some embodiments, foreground and background components may be logically decoupled in such a manner as to facilitate concurrent execution. In one example, foreground and background components may be implemented to avoid direct communication, which may reduce the likelihood of hanging (e.g., a foreground component and a background component simultaneously waiting for each other to complete a respective task, or a background component executing on the same thread as a foreground component preventing immediate processing of foreground activity). Thus, in some embodiments, a background component may rely on an operating system to report progress to a corresponding foreground component, such as to notify the foreground component that the background component has completed execution. The operating system may do so via a background status report interface provided by the foreground component, such as the "BG Status" interface of the foreground component 105 shown in FIG. 1. Such a reporting mechanism may allow foreground and background components to work together to provide a single unified experience to a user. As a specific example, when a background component downloads an electronic book from a server, progress of the download may be communicated to the user via a corresponding foreground component when the user launches the foreground component.

Another illustrative approach of decoupling is to avoid direct operation on shared data, which may reduce the likelihood of data corruption. For example, in one embodiment, a foreground component and a background component may use persistent storage for some or all data communication to reduce the likelihood of data corruption. In some further embodiments, a foreground component and a background component may operate on a shared object, such as shared objects 115A and 115B shown in FIG. 1, but only by invoking one or more interfaces (not shown) on the shared object. Such a shared object may be adapted to serialize data access, thereby preventing data corruption.

It should be appreciated that communications via an operating system and/or shared objects are merely illustrative ways that can be used, either alone or in combination, to logically decouple background components from foreground components. Other ways of decoupling may also be used, as aspects of the present disclosure are not limited to any particular manner of decoupling.

In the example shown in FIG. 1, the application 100 further includes a specification 120 that contains information that can be used by an operating system to separately load and manage foreground and background components. The specification 120 may be written in any suitable format that an operating system is configured to process. For example, the specification 120 may be in the form of an application manifest written in a suitable markup language, such as an Extensible Markup Language (XML).

The specification 120 may contain any suitable combination of information useful to an operating system. In one example, the specification 120 may identify executable code corresponding to a background component (e.g., one of the work items 110A, 110B, 110C, . . . ) and corresponding "Start" and "Cancel" interfaces for use by an operating system to, respectively, start and stop execution of the background component.

In another example, the specification 120 may specify one or more triggers in response to which an operating system is to execute a background component. In some embodiments, the specification 120 may further specify one or more conditions to be checked before the operating system executes the background component. As discussed in greater detail below in connection with FIGS. 5-7, these triggers and/or conditions may be used by an operating system to determine when the background component is to be executed, for example, to control resource consumption by the background component.

In yet another example, the specification 120 may specify one or more background work status report interfaces implemented by a foreground component (e.g., the "BG Status" interface of the foreground component 105 shown in FIG. 1). As discussed above, an operating system may use such an interface to report execution progress of a background component.

Again, the above-described items of information are merely illustrative. An application developer may choose to include any suitable combination of information in a specification to assist an operating system in separately loading and managing foreground and background components. Alternatively, or additionally, an operating system provider may request that some selected items of information and/or tools be provided in a specification for use by an operating system to separately load and manage foreground and background components.

Figure 2:
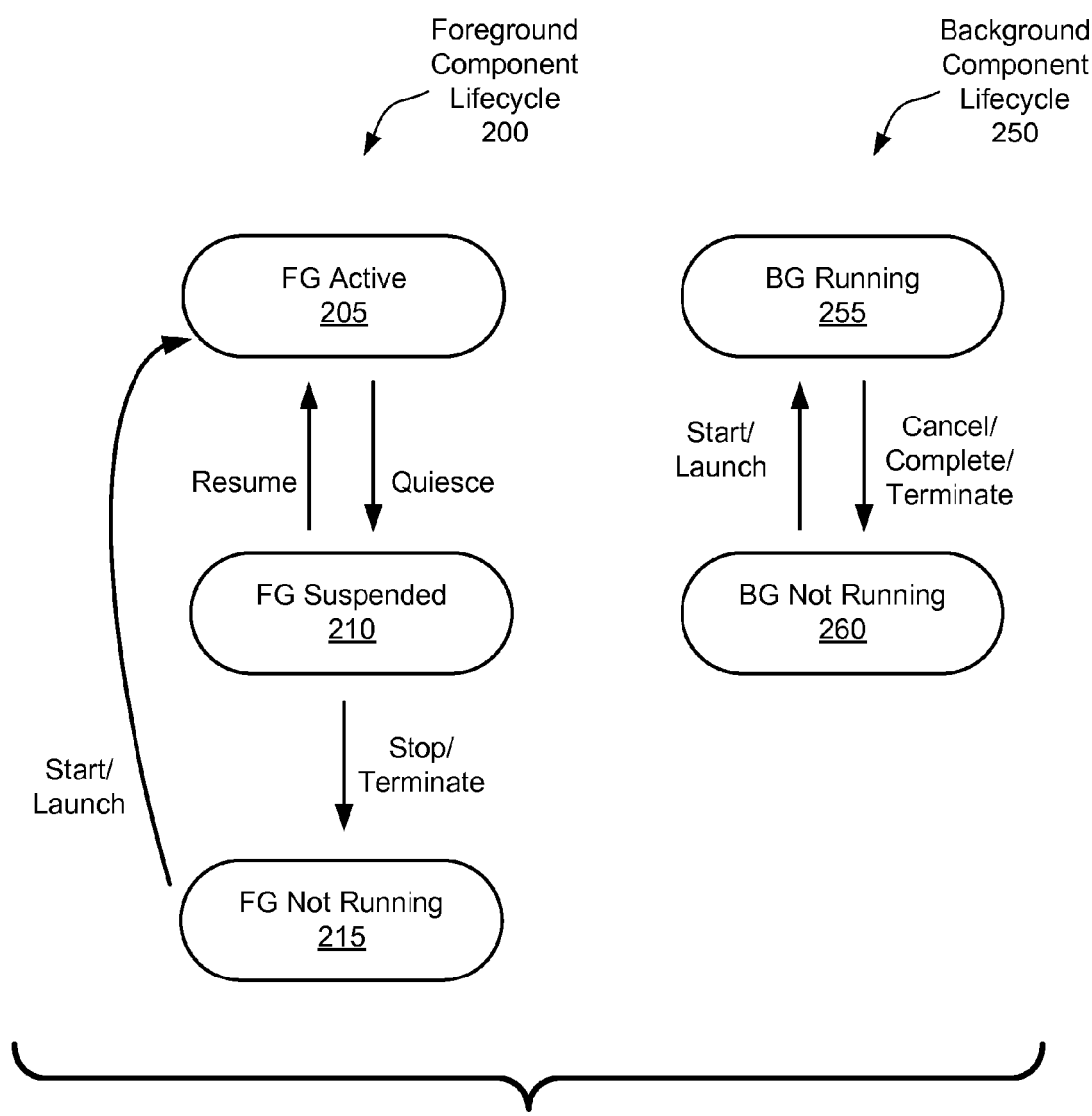
FIG. 2 shows an illustrative state diagram for an application having a foreground component and a background component that can be executed concurrently, in accordance with some embodiments.

In some embodiments, a foreground component and a background component of an application may be sufficiently decoupled that an operating system is able to separately move the foreground and background components through their respective lifecycles. FIG. 2 shows an illustrative state diagram for an application having a foreground component and a background component that can be executed concurrently.

In the example shown in FIG. 2, the state diagram for the application includes two separate component state diagrams, 200 and 250. The state diagram 200 shows an illustrative lifecycle for a foreground component of the application, and the state diagram 250 shows an illustrative lifecycle for a background component of the application.

In the illustrative lifecycle 200, the foreground component may be in one of three different states: active state 205, suspended state 210, and not running state 215. In the active state 205, the foreground component is resident in memory or in an active paging file, and is being scheduled by an operating system for execution. In the suspended state 210, the foreground component is still resident in memory or in an active paging file, but is no longer scheduled by the operating system for execution. In the not running state 215, the foreground component is no longer resident in memory, nor in any active paging file.

On the other hand, in the illustrative lifecycle 250 shown in FIG. 2, the background component may be in one of two different states: running state 255 and not running state 260. In the running state 255, the background component is resident in memory or in a paging file, and is being scheduled by an operating system for execution. In the not running state 260, the background component may no longer be resident in memory, nor in any paging file. Alternatively, a background component may be executed in a hosting environment (e.g., a container) and the hosting environment may be cached when the background component is moved to the not running state 260.

Thus, in this example, the application as a whole, including both the foreground component and the background component, may have six different states: <foreground active, background running>, <foreground suspended, background running>, <foreground not running, background running>, <foreground active, background not running>, <foreground suspended, background not running>, and <foreground not running, background no running>. The application as a whole may move through these six states as the foreground and background components move through their respective lifecycles, which are described in greater detail below. In the last state, <foreground not running, background no running>, the application may be considered terminated, because the application is running neither in the foreground nor in the background.

As mentioned above, because the foreground and the background components are logically decoupled, the operating system may be able to move one component from one state to another regardless of the state of the other component and without affecting the other component. For instance, in some embodiments, the foreground component may move from the active state to the suspended state, or vice versa, regardless of, and without affecting, the state of the background component. As a more specific example, when the foreground component moves from the active state 205 to the suspended state 210, the application as a whole may move either from <foreground active, background running> to <foreground suspended, background running>, or from <foreground active, background not running> to <foreground suspended, background not running>, depending on whether the background component is in the running state 255 or the not running state 260.

It should be appreciated that, while the foreground and background components may be implemented in a logically decoupled fashion, an operating system may (although need not) use information regarding execution of the foreground component to manage execution of the background component, or vice versa. For example, in some embodiments, the operating system may schedule the background component for execution only when the foreground component is suspended or not running. In sum, logically decoupling the foreground and background components may give an operating system an option to either create dependencies between executions of the components or not create such dependencies.

Turning now to the illustrative lifecycle 200 shown in FIG. 2, the operating system may employ any suitable set of rules for determining when to move the foreground component from one state to another. Such rules may be designed to prevent a foreground component that is not getting a user's attention from consuming resources such as battery power, processor cycles, and memory. Enforcing these rules may improve battery life and/or responsiveness of a foreground component that is getting a user's attention. In one example, the operating system may move a foreground component that is not getting a user's attention from a suspended state to a not running state to reclaim memory resources.

In some embodiments, the foreground component may initially be in the not running state, and the operating system may start the foreground component in response to a user action (e.g., a user clicking on an icon or tile corresponding to the application). Starting the foreground component may involve loading into memory the foreground component and any auxiliary components that the foreground component may access, initializing the foreground component, and/or allocating appropriate resources. If a background component of the application is already running at the time of starting the foreground component and the foreground component is loaded into the same process as the background component, some auxiliary components may already be loaded and some resources may be already allocated. Otherwise, a full launch may be performed. In either event, the foreground component may start in the active state 205, and may be scheduled by the operating system for execution.

In some embodiments, the operating system may execute an entry point function of the foreground component by invoking an API function provided by the foreground component to initialize the foreground component once the foreground component is loaded from storage. More specifically, in the example shown in FIGS. 1-2, the operating system may call a so-called "Start" method implemented by the foreground component.

The operating system may maintain the foreground component in the active state 205 when a user is actively interacting with the foreground component, to avoid interfering with the user's experience. A user may actively interact with the foreground component in a number of different ways, for example, by providing input to the foreground component via a user interface. For purposes of determining whether the foreground component is to remain in the active state, a user may also be considered to be actively interacting with the foreground component if the foreground component is rendering output (e.g., playing audio and/or video) or completing a task requested by the user (e.g., sending data over a network connection, writing to a file, printing, etc.).

In some embodiments, the operating system may move the foreground component from the active state 205 to the suspended state 210 when the user is no longer actively interacting with the foreground component. This happens, for example, when the user switches focus to a window of a different application, minimizes a window of the foreground component, fails to provide any input to the foreground component for some threshold period of time, etc. Alternatively, or additionally, the operating system may move the foreground component from the active state 205 to the suspended state 210 when the foreground component is no longer performing any activity that may be considered to be a foreground activity. Examples of activities that may be considered to be foreground activities include, but are not limited to, audio playback, device synchronization, etc.

Prior to moving the foreground component from the active state 205 to the suspended state 210, the operating system may inform the foreground component that the foreground component is about to be suspended, so the foreground component can prepare accordingly, such as by saving state and releasing allocated resources. For instance, the operating system may inform the foreground component by invoking an application programming interface (API) function provided by the foreground component. In a more specific example, as shown in FIGS. 1 and 2, the operating system may call a so-called "Quiesce" method implemented by the foreground component, which may cause the foreground component to save state and release resources (e.g., files, network connections, etc.). In some implementations, the Quiesce method may include operating system code to explicitly block the thread that invoked the Quiesce method (i.e., a thread of the foreground component) from being scheduled for execution. This may be done in addition to suspending (e.g., disabling the scheduling of) the entire foreground component as a whole. The foreground component may remain blocked until the operating system moves the foreground component back to the active state 205.

In some embodiments, the operating system may move the foreground component from the suspended state 210 back to the active state 205 when the user starts to interact with the foreground component again, for example, by switching focus back to a window of the foreground component, restoring a window of the foreground component from a minimized state, starting to provide input to the foreground component, or the like. To do so, the operating system may simply schedule the foreground component for execution. In some embodiments, the operating system may additionally invoke an API function provided by the foreground component to assist the foreground component in restoring a prior state. More specifically, in the examples shown in FIGS. 1 and 2, the operating system may call a so-called "Resume" method implemented by the foreground component, which may cause the foreground component to retrieve saved state and request for appropriate resources (e.g., files, network connections, etc.).

In some further embodiments, the operating system may move the foreground component from the suspended state 210 to the not running state 215 by removing the foreground component from memory. This may be done, for example, to reduce memory use or to allow an update to the executable code for the foreground component. If the application is not running in the background at the time the operating system moves the foreground component to the not running state 215, the application may become fully terminated. Otherwise, the background component may continue to run, irrespective of the foreground component changing state.

If the user starts to interact with the foreground component again when the foreground component has been moved to the not running state 215, the operating system may start the foreground component again, which may be similar to starting the foreground component initially, as discussed above.

It should be appreciated that the operating system may choose any suitable set of rules and techniques for determining when to move the foreground component from the active state 205 to the suspended state 210 and when to move the foreground component from the suspended state 210 to the not running state 215. These rules may reflect a desired balance between the expected benefits and the expected costs associated with suspending the foreground component, and a desired balance between the expected benefits and the expected costs associated with removing the foreground component from memory. For instance, while suspending the foreground component may lead to some savings in resources, additional processing overhead may be incurred by the foreground component to prepare for, and to resume from, suspension. Furthermore, the user may experience sluggishness when the foreground component first resumes from suspension and attempts to regain resources (e.g., re-opening files, re-establishing network connections, etc.). Similarly, while removing the foreground component from memory may reduce memory usage, additional processing overhead may be incurred by the foreground component to restart, and the user may experience sluggishness when the foreground component is being reloaded and reinitialized.

Turning to the illustrative lifecycle 250 shown in FIG. 2, the background component may initially be in the not running state 260. The operating system may, in some embodiments, start the background component in response to detecting an occurrence of one or more events. As discussed in greater detail below in connection with FIGS. 5-7, two types of events (i.e., triggers and conditions) may be taken into account to determine when to start the background component, in some illustrative embodiments.

Starting the background component may involve loading into memory the background component and any auxiliary components that the background component may access, initializing the background component, and/or allocating appropriate resources. If a foreground component of the application is already running at the time of starting the background component and the background component is loaded into the same process as the foreground component, some auxiliary components may already be loaded and some resources may be already allocated. Otherwise, a full launch may be performed. In either event, the background component may move to the running state 255.

In some embodiments, the operating system may execute an entry point function of the background component by invoking an API function provided by the background component to initialize the background component once the background component is loaded from storage. In a more specific example, as shown in FIGS. 1-2, the operating system may call a so-called "Start" method implemented by the background component.

In some embodiments, the operating system may monitor progress of the background component after the background component is started. Some background components (e.g., the work items 110A, 110B, 110C, . . . shown in FIG. 1) may each correspond to a discrete background task (e.g., downloading a piece of content from a server, checking for availability of a software update, routine virus scan, etc.). As such, these background components are not intended to run indefinitely. If the background component has not made sufficient progress after running for some threshold period of time, the operating system may stop the background component from executing, thereby moving the background component to the not running state 260.

The operating system may monitor progress of the background component using any known technique for monitoring progress of computing tasks. Alternatively, or additionally, an application may provide one or more tools for the operating system to use to monitor progress. For example, a background component may implement a "check progress" interface that an operating system may invoke to obtain progress information (e.g., percentage of task completed and/or whether the background component is waiting for response from another component or for some resource to become available). This interface may be specified in a specification associated with the application, such as the specification 120 shown in FIG. 1.

In some embodiments, the operating system may inform the background component that the background component is about to be stopped, so the background component can prepare accordingly, such as by saving state and releasing allocated resources. This may be done, for example, by invoking an API function provided by the background component. More specifically, in the example shown in FIGS. 1-2, the operating system may call a so-called "Cancel" method implemented by the background component, after which the background component may be given some small amount of time (e.g., a few seconds) before the operating system moves the background component to the not running state 260.

If the background component continues to make progress at a sufficient rate, the operating system may allow the background component to run to completion. In that case, the operating system may also move the background component to the not running state 260, for example, by removing the background component from memory.

If the application is not running in the foreground at the time the operating system moves the background component to the not running state 215, the application may become fully terminated. Otherwise, the foreground component may continue to run (e.g., in the active state 205 or the suspended state 210), irrespective of the background component changing state.

While detailed examples of application component lifecycles are shown in FIG. 2 and described above, it should be appreciated that these examples are provided solely for illustrative purposes. Aspects of the present disclosure are not limited to any particular definitions of lifecycles, nor to any particular manner of managing the lifecycles. For example, a foreground component may move through a different set of states from those shown in FIG. 2, and an operating system may employ different polices to determine when to move the foreground component from one state to another, and similarly for a background component. As another example, an operating system may load one or more instances of a same background component or different background components in a same environment (e.g., a software container), and may remove the environment from memory only when none of the instances are running. As yet another example, an operating system may keep a background component loaded indefinitely to improve efficiency.

As discussed above, an operating system may, in some embodiments, choose to load foreground and background components of an application either in the same process or in separate processes, if the foreground and background components are capable of being executed in either manner. In one example, the operating system may by default load foreground and background components in separate processes, unless an application or a user specifies otherwise. In another example, the operating system may load a background component provided by an application separately from a corresponding foreground component, but may co-locate a background component provided by the operating system with an application for which the background component is doing work. Other suitable rules may also be applied, as aspects of the present disclosure are not limited in this manner.

Figure 3A:
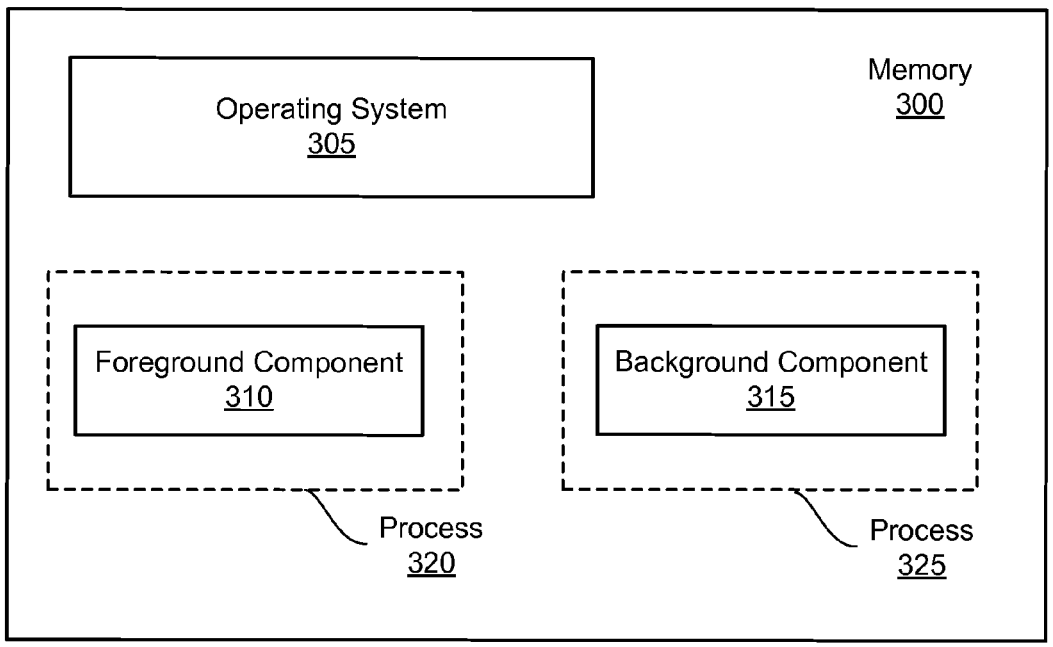
FIG. 3A shows an example in which an operating system loads a foreground component and a background component in separate processes, in accordance with some embodiments.

FIG. 3A shows an example in which an operating system 305 loads into memory 300 a foreground component 310 in process 320 and a background component 315 in a separate process 325. Isolating background work from foreground work in this manner may facilitate resource management. For example, in some embodiments, the operating system may run the process 325 in a controlled execution environment (e.g., a sandbox as known in the art) constructed to allow processes running therein to access only designated resources. In this manner, the operating system may allocate some specified amount of resources (e.g., some specified percentages of CPU time, memory, etc.) to the controlled execution environment to ensure that the background component 315 does not consume more than the specified amount of resources. The controlled execution environment may, in some implementations, be designated for running background components, so that background components of other applications may also be run in the sandbox and be subject to the same resource restrictions.

Isolating background work from foreground work in separate processes may also help to reduce memory footprint, because the operating system can avoid loading executable code (e.g., libraries) relating only to user interface (UI) functionalities when the application is only performing background work. For instance, in an embodiment where foreground work and background work are implemented as separate components, UI-related functionalities may only be present in a foreground component, which need not be loaded in a process hosting a background component.

Figure 3B:
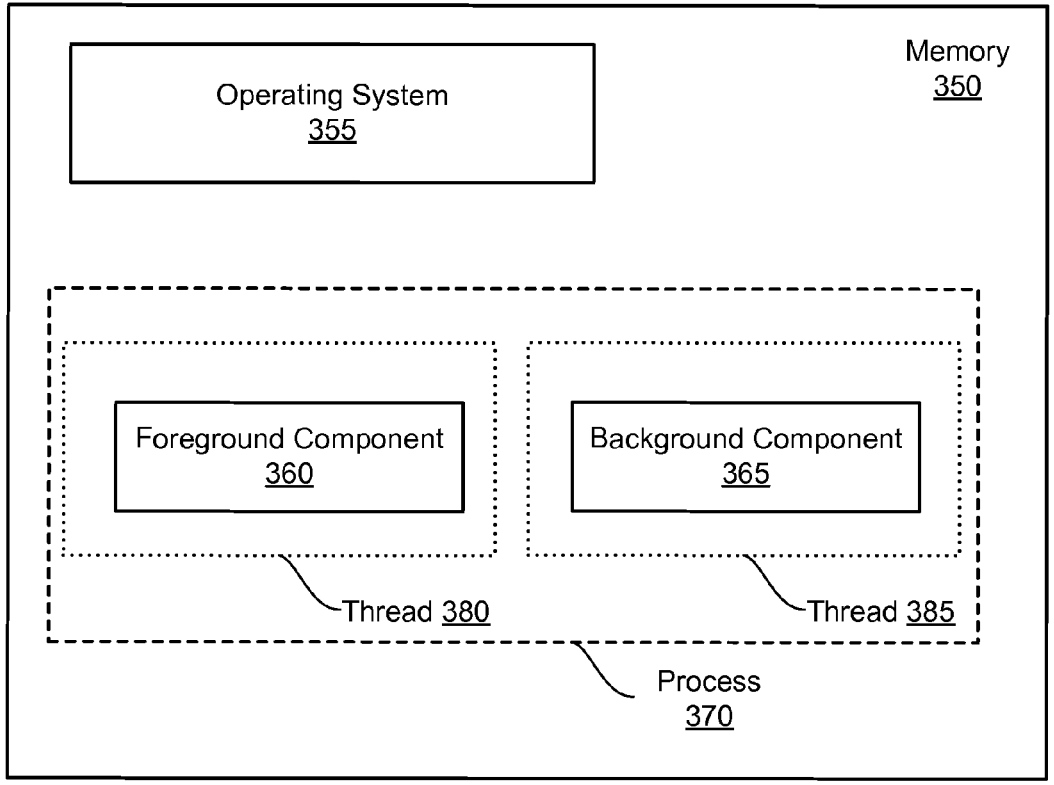
FIG. 3B shows an example in which an operating system loads a foreground component and a background component in the same process, in accordance with some embodiments.

FIG. 3B shows an example in which an operating system 355 loads into memory 350 a foreground component 360 and a background component 365 in the same process 370. Co-locating foreground work and background work in this manner may allow the foreground component 360 and the background component 365 to share startup costs. Therefore, it may be beneficial to co-locate the components if one of the components is run frequently, for example, if one or more users frequently interact with the application, or if the application frequently performs background work.

In the example shown in FIG. 3B, the foreground component 360 and the background component 365 are started by the operating system 355 as separate threads, respectively, threads 380 and 385. In this manner, the operating system 355 is still able to manage the executions of the foreground component 360 and the background component 365 separately. For example, the operating system may block the thread 380 (and therefore the foreground component 360) from execution, while allowing the thread 385 (and therefore the background component 365) to execute, and vice versa.

Thus, in some embodiments, an operating system may be adapted to decide whether to co-locate or separate foreground and background components based on a desired tradeoff between easy-to-implement resource management and reduced startup costs. Other considerations (e.g., dynamic operating conditions such as memory and/or processor usage, number of active processes, etc.) may also be taken into account, as aspects of the present disclosure are not limited to any particular reasons for co-locating or separating foreground and background components. In one example, consumption of memory and/or processor cycles may be taken into account in deciding whether to co-locate or separate foreground and background components in an implementation in which deadlocks may be prevented by keeping some or all threads of a foreground component runnable while a background component executes. In another example, software reliability may be taken into account, for instance, by separating a buggy background component to reduce interference with other foreground and/or background components.

Figure 4:
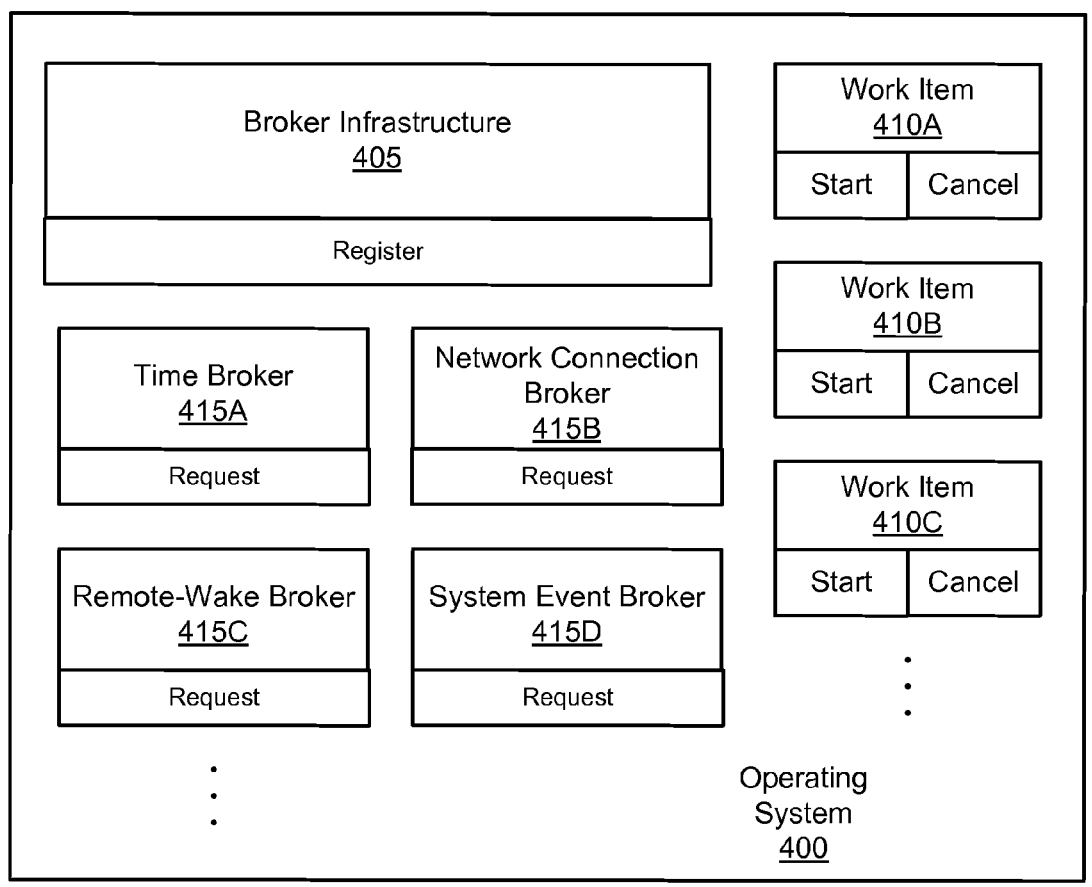
FIG. 4 shows an example of an operating system adapted to manage background work and foreground work separately, in accordance with some embodiments.

FIG. 4 shows an example of an operating system 400 adapted to manage background work and foreground work separately. In this example, the operating system 400 implements a brokered execution model for background components, where each application registers with the operating system 400 one or more application components that are intended to be run in the background, and the operating system 400 ultimately controls when, where, and/or for how long each background component is executed. In this manner, the operating system 400 may effectively control resource consumption by background components.

In the example shown in FIG. 4, the operating system 400 implements the brokered execution model using a broker infrastructure (BI) 405 and a plurality of brokers. In this example, the operating system 400 is pre-programmed with brokers, each configured to manage a respective type of resources and/or process a respective type of events. For example, the operating system 400 may include time broker 415A, network connection broker 415B, remote-wake broker 415C, and system event broker 415D, as illustrated. Such a framework may be easily extensible, for example, by allowing third parties to provide new brokers adapted to manage new types of resources and/or process new types of events (for example, a location broker may be provided so that execution of background work may depend on geographic location). However, it should be appreciated that a brokered execution model does not require the use of a framework having a broker infrastructure and a plurality of brokers. Rather, in alternative embodiments, the functionalities of the broker infrastructure and the individual brokers may be provided by a single operating system component or one or more components outside the operating system.

As discussed in greater detail below in connection with FIGS. 8-9, the broker infrastructure 405 may be responsible for managing execution of background components such as work items. For example, in some embodiments, the broker infrastructure 405 may provide an interface (e.g., the "Register" interface shown in FIG. 4) for use by an application to register a background component for brokered execution. Registering a background component may include receiving from the application an identification of the background component and an indication as to when the background component is to run (e.g., by specifying one or more triggers and/or conditions). For example, the application may provide an object identifier identifying a software object implementing a background component, and may identify an event in response to which the background component is to be executed.

In some embodiments, the broker infrastructure 405 may run a background component whenever an occurrence of a corresponding event is detected. Alternatively, the broker infrastructure 405 may enforce additional constraints and/or limitations in accordance with appropriate resource management policies. For example, the additional constraints and/or limitations may reflect policies designed to prevent a single application from consuming too much resource and/or to prevent applications that are installed but not in use from consuming any resource. In one embodiment, resources may be allocated to different applications based on how much each application is used by a user. For example, an amount of resources allocated to an application may be proportional to usage of the application as a percentage of usage of all applications. Such a policy may be desirable in a common scenario in which a user installs a large number (e.g., hundreds) of applications but only uses a small number (e.g., 10, 15, or 20) on a continual basis.

In some further embodiments, the broker infrastructure 405 may monitor progress and/or resource consumption of a background component during execution. This may be done using any known technique for monitoring progress and/or resource consumption associated with a software component. Alternatively, or additionally, the broker infrastructure may invoke an interface provided by the background component for reporting progress and/or resource consumption. The broker infrastructure 405 may discover such an interface from an application specification, such as the specification 120 shown in FIG. 1.

If the background component is not making progress at a sufficient rate, or if the background component is consuming too much resource, the broker infrastructure 405 may stop the execution of the background component. Again, the decision to stop a background component may be based on any appropriate resource management policies.

In yet some further embodiments, the broker infrastructure 405 may be responsible for reporting progress of background work to a foreground component. This may help avoid direct communication between a background component and a foreground component, which, as explained above, may facilitate logical decoupling between the foreground and background components.

In one example, the broker infrastructure 405 may notify the foreground component when the background component completes successfully, so that the foreground component may perform any suitable processing. For instance, when a download completes in the background, the broker infrastructure 405 may notify a corresponding foreground component, which may in turn notify a user that new content is available. In another example, the broker infrastructure 405 may notify a corresponding foreground component when a background component is stopped for insufficient progress or excessive resource consumption. The foreground component may, although need not, report the failure to a user, who may choose to restart the background component with an exemption to the resource management policy that was violated by the background component. However, it should be appreciated that the foreground component may not be active at the time a notification is generated. In such a scenario, the broker infrastructure 405 may notify the foreground component when the foreground component becomes active in the future (e.g., when a user clicks on a tile or icon corresponding to the foreground component). Alternatively, the broker infrastructure 405 may itself handle the notification, for example, by notifying a user of a success or failure of a background task.

Returning to FIG. 4, an application may, in some embodiments, specify a so-called "brokered event" as an event in response to which the background component is to be executed. A brokered event may be an event signaled by a broker component, such as the time broker 415A, the network connection broker 415B, the remote-wake broker 415C, the system event broker 415D, or some other broker. Each such broker may be adapted to signal events under some specified circumstances. For example, the time broker 415A may be adapted to signal events at absolute times, regular intervals, or at certain "convenient" times related to system operation (e.g., maintenance time for performing optional activities), the network connection broker 415B may be adapted to signal events when data is available on a network socket, the remote-wake broker 415C may be adapted to forward events arriving from one or more clouds servers, and the system event broker 415D may be adapted to signal events such as a user logging on or off.

In some implementations, a broker may provide an interface (e.g., the "Request" interfaces shown in FIG. 4) through which an application may request that the broker signal a brokered event under certain circumstances specified by the application. In this manner, the application may inform the operating system when a background component is intended to run. For example, as discussed in greater detail below in connection with FIGS. 5-6, a broker may allow an application to request that a brokered event be signaled when one or more "triggers" have fired. Additionally, the application may specify one or more "conditions," in addition to the firing of a trigger, that are to be met prior to signaling the brokered event.

Like the broker infrastructure 405, a broker may, in some embodiments, enforce one or more appropriate resource management policies, for instance, via one or more constraints and/or limitations. For example, in some instances, a broker may not signal a brokered event even when a trigger has fired and all conditions are met, because signaling the brokered event may violate some resource management policy. As a more specific example, the time broker 415A may limit the number of recurrences of a brokered event per day, so that the application requesting the brokered event does not execute in the background more than that number of times per day.

While several examples of brokers are discussed above, it should be appreciated that these brokers are merely illustrative. In various embodiments, an operating system may include any suitable combination of brokers adapted to enforce suitable resource management policies. Some of the policies may be static in nature, such as by specifying a fixed amount of resource that can be consumed by an application in a fixed amount of time. Other policies may be dynamic and may impose restrictions on consumption based on operating conditions (e.g., whether the system is running on battery, whether CPU and/or memory usage have remained high for a sustained period of time, etc.). Yet other policies may combine static and dynamic aspects.

Returning again to the example shown in FIG. 4, the operating system 400 additionally includes a plurality of background components, such as work items 410A, 410B, 410C, . . . . Like the work items 110A-C shown in FIG. 1, the work items 410A-C may be executed in the background to do work for an application, and may be managed by the operating system 400 in the same way as background components provided by an application. For example, the operating system 400 may enforce the same resource management policies against the work items 410A-C as against the work items 110A-C. However, in alternative embodiments, the operating system 400 may trust the work items 410A-C but not the work items 110A-C because the work items 410A-C are part of the operating system 400, whereas the work items 110A-C contain application-provided code. Accordingly, the operating system 400 may relax the policies enforced against the work items 410A-C because the work items 410A-C are trusted. For instance, the operating system 400 may load the work items 110A-C in a sandbox separated from foreground components, but may load the work items 410A-C in the same processes as respective foreground components.

Again, it should be appreciated that aspects of the present disclosure are not limited to using background components from any particular source. Background components may, in various embodiments, be written by operating system developers, application developers, and/or any other third party software provider.

Figure 5:
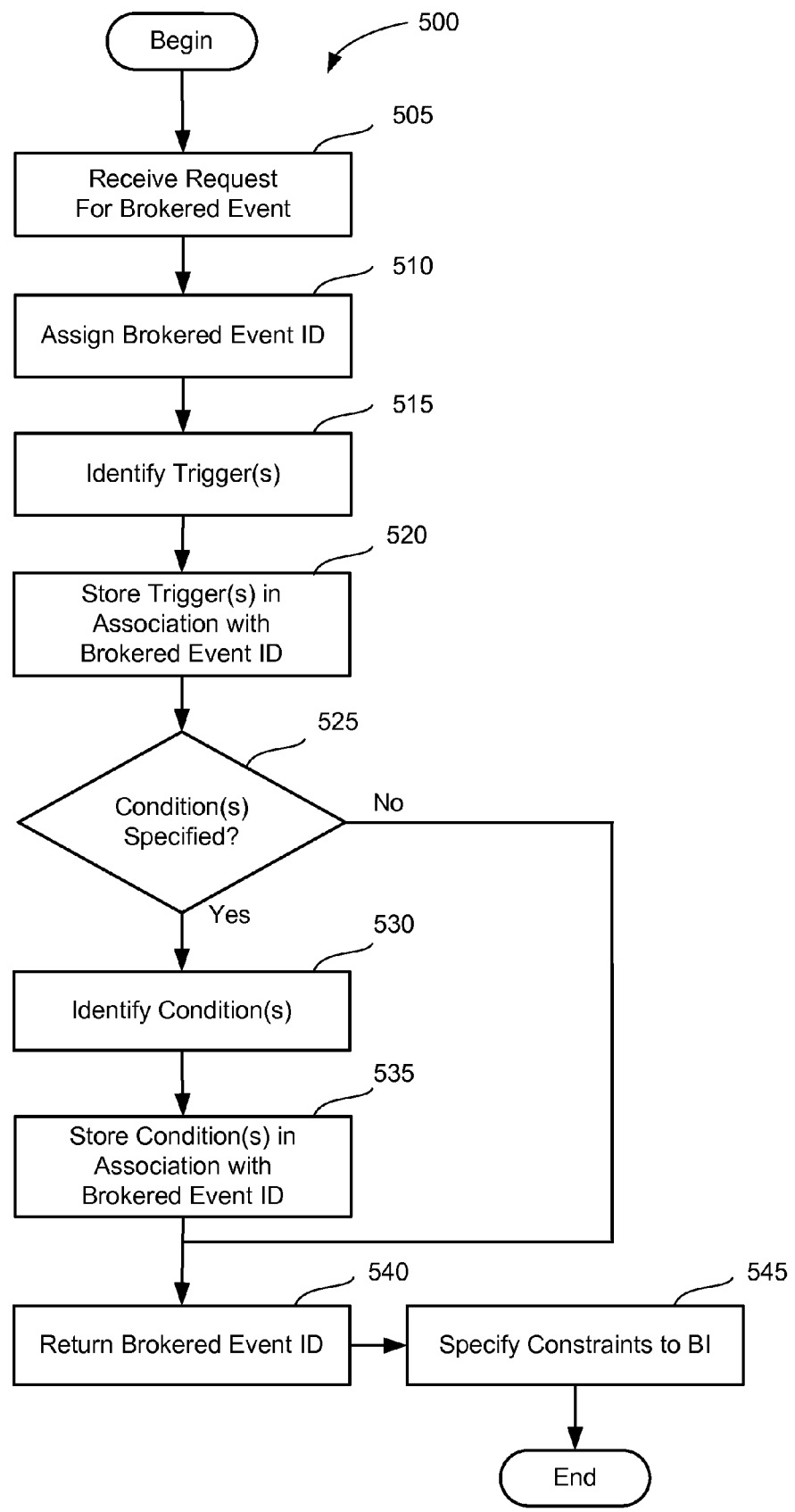
FIG. 5 is a flowchart of an illustrative process that may be performed by a broker component in response to a request to arrange for a brokered event, in accordance with some embodiments.
Figures 6, 7:
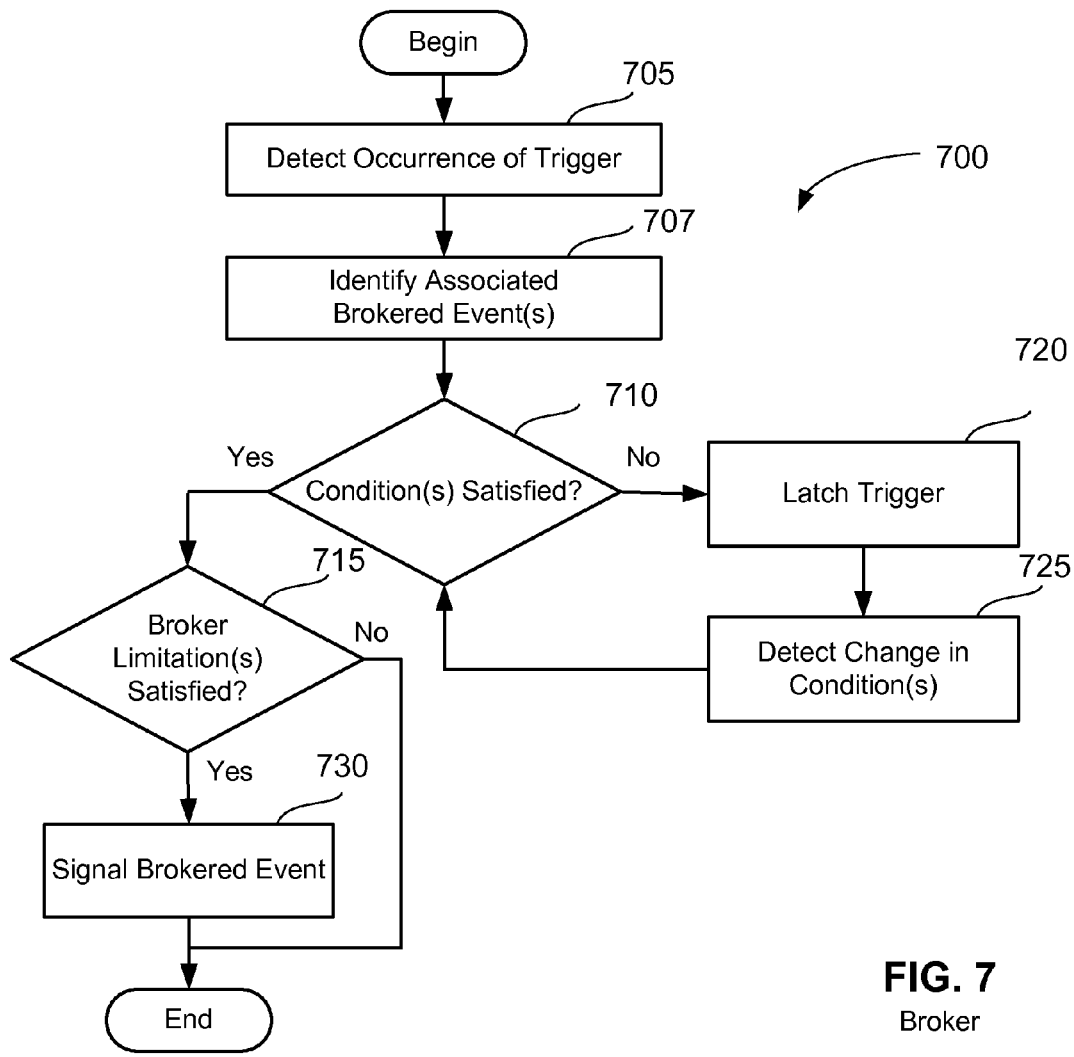
FIG. 6 shows an illustrative data structure that can be used by a broker component to store information regarding brokered events, in accordance with some embodiments.
FIG. 7 is a flowchart of an illustrative process that can be performed by a broker component to determine when to signal a brokered event, in accordance with some embodiments.

FIG. 5 shows an illustrative process 500 that may be performed by a broker component in response to a request to arrange for a brokered event, in accordance with some embodiments, and FIG. 6 shows an illustrative data structure 600 that may be used by the broker component in connection with the process 500. For example, the process 500 may be performed by one of the brokers 415A-D shown in FIG. 4 in response to an application invoking the "Request" interface.

At act 505, the broker component may receive a request for a brokered event. In various embodiments, the request may include any combination of information items that the broker may use to decide when to signal the requested brokered event. For example, the broker's API may indicate certain items of desired information to allow the broker to enforce one or more resource management policies. Examples of such information items include, but are not limited to, an identification of the requester (e.g., an application), one or more triggers in response to which the requested brokered event is to be signaled, one or more conditions that are to be satisfied when the requested brokered event is signaled, an indication of an intended purpose of the requested brokered event (e.g., to cause an operating system to execute a selected background component), and any other suitable items of information.

At act 510, the broker component may assign a brokered event ID to the requested brokered event. This brokered event ID may be unique to each request for a brokered event. For example, if two applications each request a brokered event via a different invocation of the broker's API, the broker may assign different brokered event IDs even if the underlying triggers are the same. In this manner, the broker may signal two different brokered events when the underlying trigger fires, each brokered event bearing a different brokered event ID.

Although not required, unique brokered event IDs may be beneficial because different applications may specify different conditions for a brokered event, even if the triggers are the same. Furthermore, one or more resource management policies enforced by the broker may apply differently depending on the particular application. Thus, unique brokered event IDs may be used to ensure that an appropriate set of conditions, whether imposed by a corresponding application or the operating system, are applied to control the signaling of a brokered event.

At act 515, the broker may identify one or more triggers in response to which the requested brokered event is to be signaled. A trigger may be any event that the broker is programmed to detect. In one example, a trigger may be a user related event, such as a user logging on or off, a user becoming active (e.g., by providing any input such as typing, moving a mouse, speaking, etc.), a user becoming inactive (e.g., by failing to provide any input for at least a threshold period of time), a user starting a user session, a user requesting a download, a user initializing a print job, or the like. In another example, a trigger may be a system related event, such as expiration of a timer, arrival of a message or notification (e.g., an SMS message or an operator message notification), change in network state, network channels being reset, Internet becoming available or unavailable, completion of a software update, or the like. In yet another example, a trigger may be an application related event, such as an application requesting that a brokered event be signaled immediately to cause the operating system to start a background component right away. In yet another example, a trigger may be a synthetic event created by an operating system component (e.g., a broker) by combining knowledge of one or more events from different sources, one or more system conditions, and/or one or more system policies. A specific example of such a synthetic event may be "maintenance time," which may indicate a start of a period of operating designated for maintenance.

While an application may specify one trigger for the requested brokered event, multiple triggers may be specified in some instances. For example, the broker may treat the triggers as alternatives, so that the firing of any one trigger may cause the signaling of the requested brokered event, provided any and all specified conditions are satisfied. Alternatively, the broker may treat some or all of the triggers as conjuncts, or may allow an application to specify any suitable logical combination of triggers. In yet some further embodiments, multiple brokers may be provided, each responding to a single trigger, and may collectively implement a combination of multiple triggers.

At act 520, the broker may store the one or more triggers identified at act 515 in association with the brokered event ID assigned at act 510. The triggers may be stored in any suitable way. In some embodiments, each trigger may be stored as a trigger configuration and a trigger type. As another example, the broker may store the triggers and the brokered event ID in the illustrative data structure 600 shown in FIG. 6. In this embodiment, the data structure 600 may include a plurality of entries, each corresponding to a requested brokered event and having at least three fields, field 605 for storing brokered event IDs, field 610 for storing triggers, and field 615 for storing conditions. For example, in the first illustrative entry, a brokered event ID "$BE_1$" is associated with a plurality of alternative triggers "$E_{1,1}$," "$E_{1,2}$," . . . and a single condition "$C_{1,1}$." Although not shown, the entries in the data structure 600 may have additional fields, for example, to store other items of information that may allow the broker to enforce one or more resource management policies.

Returning to FIG. 5, at act 525, the broker may determine whether one or more conditions are specified that are to be satisfied when the requested brokered event is signaled. If one or more conditions are specified, the broker may proceed to identify the conditions at act 530. Otherwise, the broker may skip acts 530 and 535 and proceed directly to act 540.

As discussed above, conditions may be specified by the application requesting the brokered event, for example, to inform the operating system of a set of circumstances under which an associated background component is likely to perform useful work. For instance, a background component for downloading content from the Internet may only be able to perform useful work when a connection to the Internet is available. Accordingly, the application may request that the brokered event be signaled only when the Internet is available.

Other examples of conditions include, but are not limited to, user-related conditions (e.g., user being active or inactive), system-related conditions (e.g., network being available/unavailable), application-related conditions (e.g., application having been actively used by user recently in the past, for example, as determined by some threshold amount of time, application not having exceeded certain resource allocation granted by the operating system, etc.), and the like.

An application may specify any number of conditions, as aspects of the present disclosure are not limited to any particular number of conditions being specified for a brokered event. For example, an application may specify one or more conditions, or no conditions at all. The broker may treat the conditions as conjuncts, so that the requested brokered event is not signaled unless all specified conditions are satisfied, even if a corresponding trigger has fired. Alternatively, the broker may treat the conditions as alternatives, so that the requested brokered event is signaled if any one of the specified conditions is satisfied when a corresponding trigger fires. In some further embodiments, the broker may allow the application to specify any suitable logical combination of conditions.

Alternatively, or additionally, an operating system or an application (e.g., an applet) other than the application requesting the brokered event may also specify one or more conditions to be associated with a brokered event. For instance, in some embodiments, a broker may implement an interface for an operating system or application to invoke to specify and/or modify conditions associated with a brokered event, for example, by providing the brokered event ID assigned at act 510.

If one or more conditions are identified at acts 525 and 530, the broker may, at act 535, store the identified conditions in association with the brokered event ID assigned at act 510. For example, the broker may store the conditions in the illustrative data structure 600 shown in FIG. 6 and discussed above.

At act 540, the broker may return the brokered event ID assigned at act 510 to the application requesting the brokered event, so that the application may invoke another operating system functionality to associate the brokered event with a desired background component. As discussed in greater detail in connection with FIG. 9, the application may, in some embodiments, register the background component for execution with a broker infrastructure (or any other suitable operating system component), which may execute the background component in response to the broker signaling a brokered event identified by the brokered event ID.

At act 545, the broker may specify to the broker infrastructure (or any other intended recipient of signaled brokered events) any additional constraints associated with the requested brokered event. For example, in some embodiments, the broker may be a specialized component for managing a particular type of resources, and may convey to the brokered infrastructure any specialized policies to be applied in handling brokered events relating to that particular type of resources. This information may be conveyed in any suitable manner, for example, via direct communication between the broker and the broker infrastructure using the brokered event ID assigned at act 510, or by providing the information to the application to be submitted to the broker infrastructure along with the brokered event ID assigned at act 510.

Examples of suitable constraints that may be specified by the broker include, but are not limited to, requiring the broker infrastructure to notify the broker before and/or after executing one or more background components in response to the requested brokered event, exemption for any background component associated with the requested brokered event from the broker infrastructure's throttling rules, a deadline by which one or more background components are to be executed and/or completed after the requested brokered event is signaled, running all background components associated with brokered events from this broker in the same process and terminating that process only as last resort, serializing background components associated with brokered events from this broker, persisting a signaled brokered event across system reboot and/or notifying the broker after the system reboot of the persisted signaled brokered event, and the like.

While specific examples of triggers, conditions, and constraints are discussed above in connection with FIG. 5, it should be appreciated that aspects of the present disclosure are not limited to any particular combination of triggers, conditions, and/or constraints specified by an application and/or operating system. In some embodiments, triggers, conditions, and/or constraints may be represented as general programs to be interpreted by an operating system component (e.g., a broker) to determine when to execute a background work item. Furthermore, while illustrative embodiments are described in which a broker infrastructure and individual brokers form a two-level structure, other embodiments may include a multi-level hierarchy of brokers, where a broker at one level may combine events from one or more other brokers at lower levels.

FIG. 7 shows an illustrative process 700 that may be performed by a broker component to determine when to signal a brokered event, in accordance with some embodiments. For example, the process 700 may be performed by one of the brokers 415A-D shown in FIG. 4.

At act 705, the broker may detect a trigger firing. As discussed above, this may include receiving an event from the operating system indicating something just happened, such as a user logging on or off, network becoming available or unavailable, a timer expiring, and the like.

In response to detecting the trigger firing, the broker may, at act 707, identify one or more associated brokered events that are to be signaled. This may be done, for example, by accessing a data structure such as that shown in FIG. 6. For instance, the broker may identify one or more entries in the data structure 600 having the fired trigger stored in the "Trigger(s)" field 610. If multiple such entries are identified, the broker may process the entries one by one.

For each entry matching the fired trigger, the broker may, at act 710, determine whether any conditions are specified for the corresponding brokered event and, if so, whether all such conditions are satisfied. In some embodiments, this may be done by checking the corresponding "Condition(s)" field 615 as shown in FIG. 6 and evaluating all stored conditions. In alternative embodiments, the broker may maintain, for each stored condition, a Boolean variable indicative of whether the stored condition is currently satisfied, and any auxiliary variables for evaluating the condition. The broker may continually update the Boolean variable, for example, in response to changes in the auxiliary variables. In this manner, the broker may simply check the Boolean variable at act 710, without having to evaluate the condition again.

If all associated conditions are satisfied, or if no conditions are stored in the field 615, the broker may proceed to act 715. Otherwise, the broker may latch the trigger at act 720 and continue to monitor the associated conditions. In an embodiment in which the broker maintains a Boolean variable for each stored condition, monitoring the conditions may simply include continually updating the Boolean variables. If and when a change is detected for one or more of the associated conditions at act 725, the broker may return to act 710 to check if all associated conditions are satisfied. The broker may loop around acts 710, 720, and 725 indefinitely, unless a deadline is associated with the latched trigger, in which case the broker may discard the latched trigger when the deadline expires.

If at some point all of the associated conditions become satisfied, the broker may, at act 715, check whether any broker limitations are applicable to the brokered event and, if so, whether the applicable broker limitations are satisfied. As discussed above, the broker may enforce one or more resource management policies, and may refrain from signaling a brokered event even after a trigger has fired and all application-specified conditions are met, as a way of controlling resource consumption by an application. Broker limitations may be a mechanism for enforcing these resource manage policies. In one example, a limitation may be placed on how often a single application can make use of resources managed by the broker (e.g., in terms of number of times per day or some other suitable time period, or how much of the managed resources has already been consumed by background activities from the application, or the system as a whole, within the time period). Other types of broker limitations may also be specified, as aspects of the present disclosure are not limited to any particular type of broker limitations.

If all applicable broker limitations are satisfied, the broker may signal the brokered event at act 720, otherwise the broker may simply discard the fired trigger. In some embodiments, the broker may request an operating system to mark that a brokered event was not signaled because certain conditions and/or limitations were not satisfied. The operating system may in turn notify the application that requested the brokered event (e.g., via an API function such as the "BG Status" interface of the foreground component 105 shown in FIG. 1), although such a notification is not required.

Although specific examples of brokers and broker functionalities are described above in connection with FIGS. 5-7, it should be appreciated that aspects of the present disclosure are not limited to the use of a framework having a broker infrastructure and a plurality of brokers, nor to any specific division of responsibilities between a broker infrastructure and individual brokers. For instance, in alternative embodiments, any suitable subset of the broker functionalities described herein may be implemented by a broker infrastructure. In one example, a broker infrastructure may keep track of associations between brokered events and applications that requested the broker events, so that applications and/or brokers can obtain that information from the broker infrastructure. This may be done as a way of persisting such information. In another example, a broker infrastructure may be programmed to latch a trigger and/or monitor associated conditions to determine when to signal a brokered event. In this manner, an application may be able to request a brokered event for which some triggers and/or conditions are implemented by different brokers, because the broker infrastructure may be able to manage state information from multiple individual brokers. Furthermore, modular development may be facilitated in an implementation in which the broker infrastructure handles the monitoring of conditions, because individual brokers no longer need to "understand" or deal with conditions.

Figures 8A, 8B:
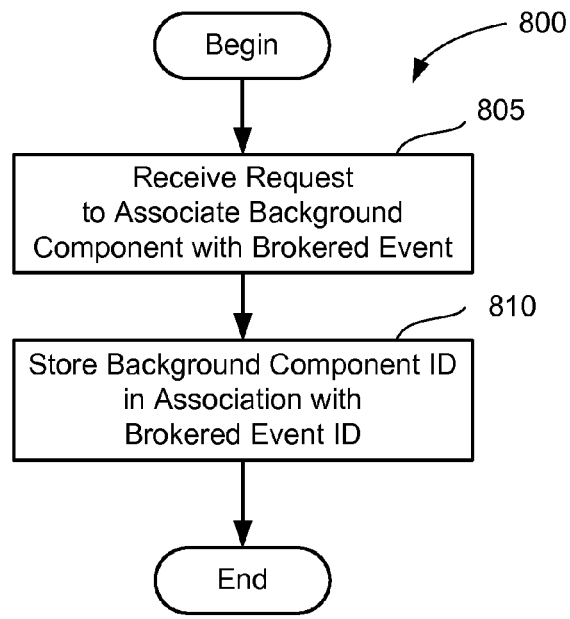
FIG. 8A is a flowchart of an illustrative process that can be performed by a broker infrastructure to associate a background component with a brokered event, in accordance with some embodiments.
FIG. 8B shows an illustrative data structure that can be used to store brokered events in association with background components, in accordance with some embodiments.

FIG. 8A shows an illustrative process 800 that may be performed by a broker infrastructure (BI), or some other suitable operating system component, to associate a background component with a brokered event, in accordance with some embodiments. FIG. 8B shows an illustrative data structure 850 that can be used in connection with the process 800. An association created by the process 800 may allow the operating system to load and execute the background component in response to the brokered event being signaled. In one example, the process 800 may be performed by the broker infrastructure 405 shown in FIG. 4. However, aspects of the present disclosure are not limited to having any particular operating system component perform an association process. In some alternative embodiments, a broker responsible for signaling the brokered event may associate a background component with a brokered event, for example, as part of a process for establishing the brokered event in response to a request from an application.

At act 805, the BI may receive a request to associate a background component, such as a work item, with a brokered event. The request may be received from any suitable entity, as aspects of the present disclosure are not so limited. For instance, in some embodiments, an application may submit such a request to have the background component executed to do background work for the application. In some other embodiments, a broker responsible for signaling the brokered event may submit such a request on behalf of an application, for example, when the application requests the brokered event from the broker, or when the application is installed or updated.

At act 810, the BI may store a background component ID in association with a brokered event ID, for example, in the illustrative data structure 850 shown in FIG. 8B. In this embodiment, the data structure 850 may include a plurality of entries, each corresponding to a brokered event and having at least two fields, field 855 for storing brokered event IDs and field 860 for storing background component IDs. For example, in the first illustrative entry, a brokered event ID "$BE_1$" is associated with a background component ID "ObjectActivationClass$_1$," which may identify a software object implementing the background component. Although not shown, the entries in the data structure 850 may have additional fields, for example, to store information indicating a storage location from which the background component may be loaded and/or information that may allow the BI to enforce one or more resource management policies when managing the background component. In one example, the BI may store an identification of an application requesting to have the background component executed, so that the BI may enforce policies applicable to that application when managing the background component. In another example, the BI may store constraints specified by the broker responsible for signaling the brokered event, for instance, as discussed above in connection with act 545 of FIG. 5.

Figure 9:
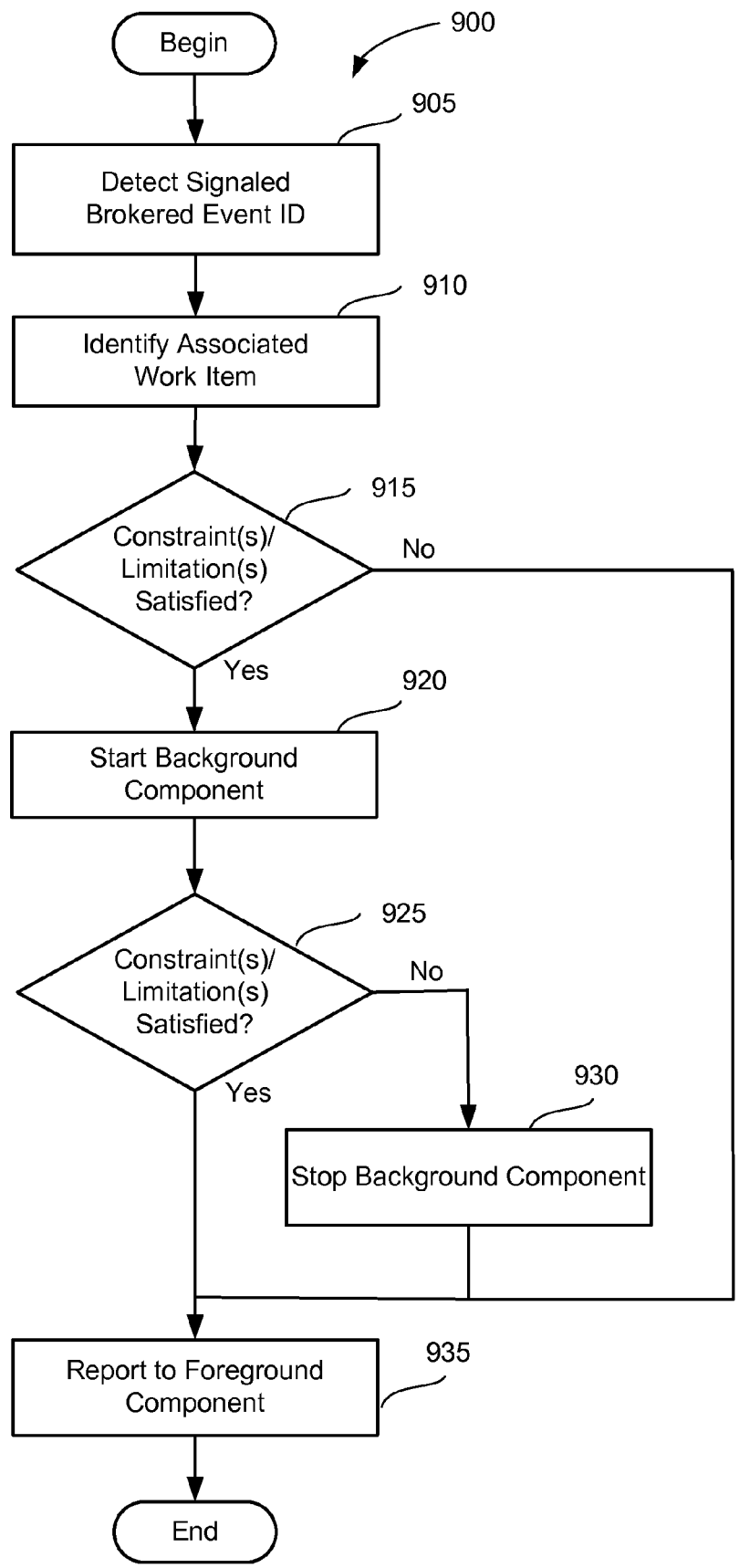
FIG. 9 shows an illustrative process 900 that may be performed by a broker infrastructure to determine when to execute a background component and how to manage the background component's execution, in accordance with some embodiments.

FIG. 9 shows an illustrative process 900 that may be performed by a broker infrastructure (BI) component, or some other suitable operating system component, to determine when to execute a background component and how to manage the background component's execution, in accordance with some embodiments. For example, the process 900 may be performed by the BI component 405 shown in FIG. 4.

At act 905, the BI may detect a brokered event signaled by a broker. In response to detecting the signaled brokered event, the BI may, at act 910, identify one or more associated background components to be executed. This may be done, for example, by accessing a data structure such as that shown in FIG. 8B. For instance, the BI may identify one or more entries in the data structure 850 having the signaled brokered event stored in the "Brokered Event ID" field 855. If multiple such entries are identified, the BI may process the entries one by one.

For each entry matching the signaled brokered event, the BI may, at act 915, check if any constraints and/or limitations are applicable and satisfied. As discussed above in connection with act 545 of FIG. 5, a constraint may be a specialized resource management rule conveyed by a broker to the BI to assist the BI in managing the resources associated with the signaled brokered event. A limitation, on the other hand, may capture any resource management policies enforced by the BI. These policies may, although need not, overlap with those enforced by individual brokers. In some implementations, a BI may be a general operating system component (in contrast with a broker which may be specially adapted to manage a specific type of resources), and may be able to apply aggregate limitations that relate to multiple aspects of resource management.

In one example, a BI may impose a limit on how much processor time may be allocated to background work execution, for instance, in terms of a percentage of processor time, or a specified amount of processor time per day or some other suitable period of time. This limitation may be imposed at all times, or only under certain circumstances, such as when the system is running on battery. In another example, a BI may allocate a percentage of a background execution budget to an application based on how much "face time" the application gets with a user, namely, how often the user uses the application relative to other applications (e.g., in terms of a percentage of actual time spent by the user interacting with the application, or a percentage of processor time used by a foreground component of the application). In yet another example, a BI may prevent a background component from running if a user has not run any associated foreground component in a long time (e.g., over a selected threshold length of time such as one month, two months, three months, etc.).

If all applicable constraints and BI limitations are satisfied, the BI may proceed to act 920 to load and execute the background component. Otherwise, the BI may proceed to act 935 to report a failure to a corresponding foreground component. In some embodiments, the report may identify one or more reasons for failure, so the foreground component may take appropriate actions, such as prompting a user to approve an exemption to a violated constraint or BI limitation.

If the BI determines at act 915 that all applicable static constraints and BI limitations are satisfied and starts the background component at act 920, the BI may monitor, at act 925, whether all applicable dynamic constraints and BI limitations are satisfied while the background component executes. Examples of dynamic BI limitations include, but are not limited to, a limitation on how much processor time a background component may use relative to other background components (e.g., in terms of a percentage of a processor time budget allocated for background execution), and a minimum rate at which a background component is to progress towards completion.

If any dynamic constraint or BI limitation is violated during execution, the background component may be stopped at act 930, and the BI may proceed to act 935 to report a failure to complete execution of the background component. Again, in some embodiments, the report may identify the reasons for failure so the foreground component may take appropriate actions. If no dynamic constraints or BI limitations are violated during execution, the background component may complete and the BI may proceed to act 935 to report a successful completion of the background component. However, it should be appreciated that various techniques described herein for managing background components may be used to manage applications with no foreground components, such as background services running on any types of computing devices.

It should be appreciated that various brokered execution models described above in connection with FIGS. 4-9 may, in some embodiments, be applied by an operating system to manage execution of background work, but not execution of foreground work, thereby resulting in differentiated management of foreground work and background work. However, in alternative embodiments, brokered execution may also be used to manage foreground work, for example, to control resource consumption. For example, execution of foreground work may be caused by brokered events signaled in response to user inputs. In such an embodiment, however, a user may perceive more sluggishness due to one or more layers of resource management mechanisms that are applied in a brokered execution model. Thus, in deciding whether to use brokered execution for foreground work, a tradeoff may be made between conserving resources and maintaining responsiveness of active foreground components.

Figure 10:
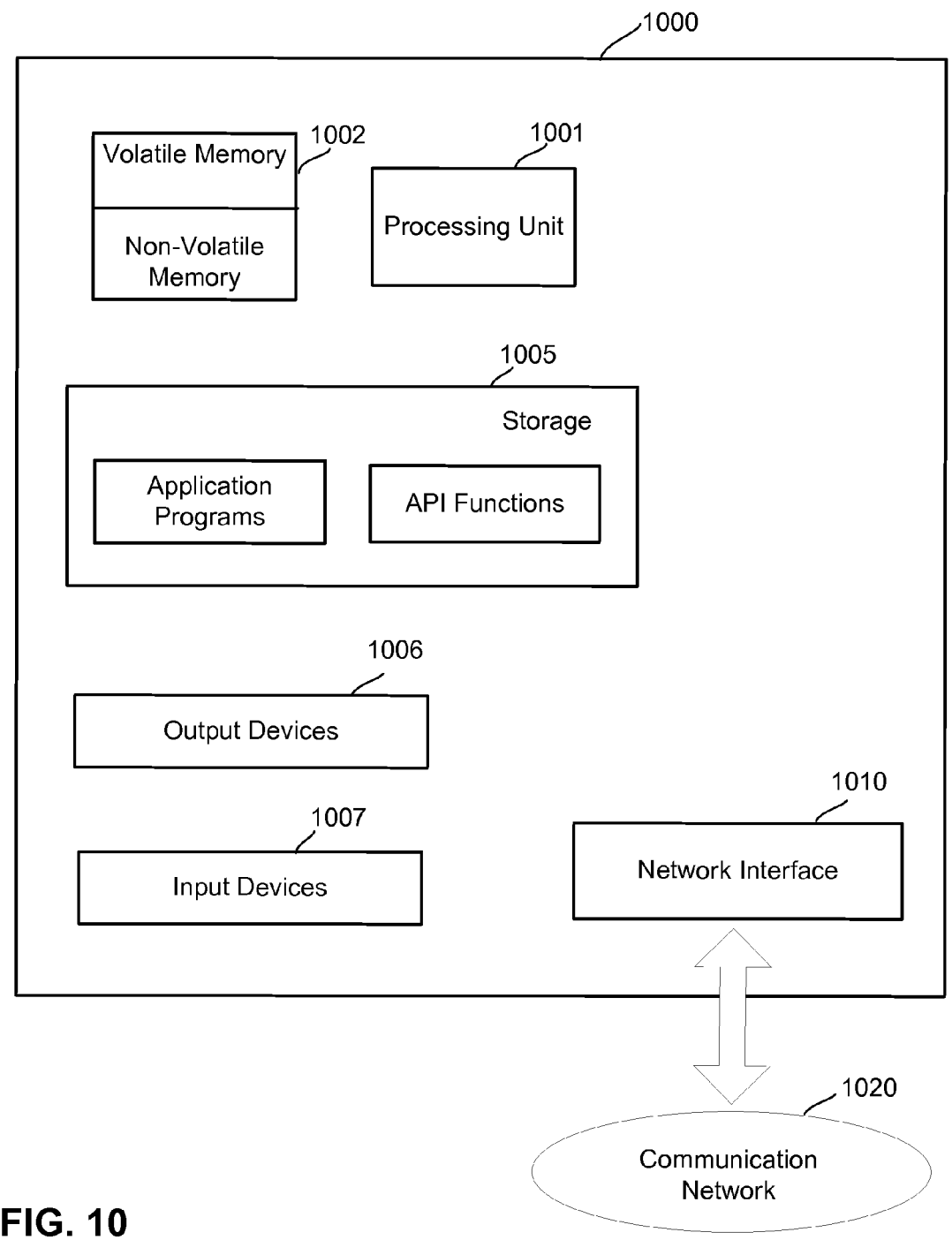
FIG. 10 shows, schematically, an illustrative computer on which various aspects of the present disclosure may be implemented.

FIG. 10 shows, schematically, an illustrative computer 1000 on which various inventive aspects of the present disclosure may be implemented. For example, the computer 1000 may be a mobile device on which any of the features described herein may be implemented.

As used herein, a "mobile device" may be any computing device that is sufficiently small so that it may be carried by a user (e.g., held in a hand of the user). Examples of mobile devices include, but are not limited to, mobile phones, pagers, portable media players, e-book readers, handheld game consoles, personal digital assistants (PDAs) and tablet computers. In some instances, the weight of a mobile device may be at most one pound, one and a half pounds, or two pounds, and/or the largest dimension of a mobile device may be at most six inches, nine inches, or one foot. Additionally, a mobile device may include features that enable the user to use the device at diverse locations. For example, a mobile device may include a power storage (e.g., battery) so that it may be used for some duration without being plugged into a power outlet. As another example, a mobile device may include a wireless network interface configured to provide a network connection without being physically connected to a network connection point.

In the example shown in FIG. 10, the computer 1000 includes a processor or processing unit 1001 and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The memory 1002 may also store one more application programs and/or Application Programming Interface (API) functions.

The computer 1000 may have one or more input devices and/or output devices, such as devices 1006 and 1007 illustrated in FIG. 10. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 10, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone, a cash register, an Automatic Teller Machine (ATM), or any other suitable portable or fixed electronic device.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use by an operating system executing on at least one computer that is configured to operate applications in a foreground mode of operation and a background mode of operation, the method comprising acts of:

accessing an application to be loaded for operation by the operating system, the application including at least one foreground component and at least one background component that is decoupled from the at least one foreground component;

identifying the at least one foreground component of the application that, when loaded, causes the application to be operated in the foreground mode;

identifying the at least one background component of the application that, when loaded, causes the application to be operated in the background mode;

identifying a specification within the application that specifies information that is usable by the operating system to separately load and manage at least one foreground component and the at least one background component;

determining whether to load the at least one foreground component and the at least one background component in a same process or in different processes; and loading the at least one foreground component for execution separately from the at least one background component in the same process or in the different processes based on the determination.

2. The method of claim 1, further comprising:
identifying at least one foreground entry point of the application; and
identifying at least one background entry point of the application, the at least one background entry point being different from the at least one foreground entry point.

3. The method of claim 1, further comprising acts of:
receiving a brokered event signaled by an operating system broker component, the brokered event being associated with the at least one background component; and
in response to receiving the brokered event, loading the at least one background component for execution.

4. The method of claim 1, wherein the act of loading the at least one foreground component for execution separately from the at least one background component comprises:
loading the at least one foreground component in response to a user action, without loading the at least one background component.

5. The method of claim 1, wherein the act of loading the at least one foreground component for execution separately from the at least one background component comprises:
loading the at least one background component in at least one controlled execution environment, thereby isolating the at least one background component from the at least one foreground component.

6. The method of claim 1,
wherein the at least one foreground component and the at least one background component are loaded in the different processes.

7. The method of claim 1, wherein:
the at least one background component comprises at least one dynamic link library (DLL).

8. At least one hardware storage device having encoded thereon, at least computer executable code corresponding to a particular application, including:
at least one first piece of computer executable code corresponding to a particular application which is operable, when executed by one or more processor of a computer, for implementing at least one foreground component of the particular application by an operating system of the computer;
at least one second piece of computer executable code corresponding to the particular application which is operable, when executed by the one or more processor of a computer, for implementing at least one background component of the application by the operating system of the computer; and
a specification specifying information that is usable by the operating system for determining whether to load the at least one foreground component and the at least one background component in a same process or in different processes and to separately load and manage the at least one foreground component and the at least one background component in the same process or in the different processes based on the determination, the specification specifically identifying the at least one second piece of code as being associated with background work for the particular application.

9. The hardware storage device of claim 8, wherein:
the at least one first piece of computer executable code is associated with a first entry point; and
the at least one second piece of computer executable code is associated with a second entry point different from the first entry point.

10. The hardware storage device of claim 8, wherein:
the at least one second piece of computer executable code implementing the at least one background component comprises at least one dynamic link library (DLL).

11. The hardware storage device of claim 8, wherein:
the at least one background component of the application comprises a background task; and
the specification further identifies a start interface for starting the background task and a cancel interface for cancelling the background task.

12. The hardware storage device of claim 8, wherein:
the at least one foreground component comprises an interface for receiving a report concerning execution progress of the at least one background component.

13. The hardware storage device of claim 8, further having encoded thereon computer executable code for performing acts of:
requesting that a brokered event be signaled in response to one or more triggers; and
requesting that the at least one background component be executed in response to the brokered event.

14. The hardware storage device of claim 13, wherein the act of requesting that a brokered event be signaled in response to one or more triggers comprises:
specifying at least one condition to be satisfied prior to the brokered event being signaled.

15. A computer implemented method comprising acts of:
executing, in response to a user action, at least one first piece of computer executable code implementing at least one foreground component of an application, the application including a specification that specifies information that is usable by the operating system for determining whether to load the at least one foreground component and the at least one background component in a same process or in different processes and to separately load and manage the at least one foreground component and at least one background component of the application in the same process or in the different processes based on the determination; and
using the specification to identify at least one second piece of computer executable code which is operable for implementing the at least one background component of the application independently of the at least one foreground component, and wherein the at least one foreground component is executed without executing the at least one background component.

16. The method of claim 15, wherein:
the at least one first piece of executable code comprises at least one foreground entry point of the application; and
the at least one second piece of computer executable code is identified as a background component by information identifying at least one background entry point of the application in the at least one second piece of computer executable code, the at least one background entry point being different from the at least one foreground entry point.

17. The method of claim 15, further comprising an act of:
receiving a request that the at least one background component be executed in response to a brokered event signaled by an operating system broker component.

18. The method of claim 17, further comprising acts of:
receiving the brokered event signaled by the operating system broker component; and
in response to receiving the brokered event, loading the at least one background component for execution.

19. The method of claim 18, further comprising an act of:
providing, to the at least one foreground component, a report concerning execution progress of the at least one background component.

20. The method of claim 15, further comprising an act of:
loading the at least on background component in at least one controlled execution environment, thereby isolating the at least one background component from the at least one foreground component.

* * * * *